United States Patent
Hong et al.

(10) Patent No.: US 12,518,848 B2
(45) Date of Patent: Jan. 6, 2026

(54) MEMORY DEVICE INCLUDING REPAIR CIRCUIT AND OPERATING METHOD THEREOF

(71) Applicant: SAMSUNG ELECTRONICS CO., LTD., Suwon-si (KR)

(72) Inventors: Seungki Hong, Suwon-si (KR); Seungjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 18/543,687

(22) Filed: Dec. 18, 2023

(65) Prior Publication Data

US 2024/0257896 A1 Aug. 1, 2024

(30) Foreign Application Priority Data

Feb. 1, 2023 (KR) ........................ 10-2023-0013879

(51) Int. Cl.
*G11C 29/18* (2006.01)
*G11C 29/44* (2006.01)

(52) U.S. Cl.
CPC .............. *G11C 29/44* (2013.01); *G11C 29/18* (2013.01); *G11C 2029/1802* (2013.01)

(58) Field of Classification Search
CPC .................... G11C 29/44; G11C 29/18; G11C 2029/1802; G11C 29/806; G11C 29/814; G11C 29/76; G11C 2029/1202; G11C 2029/1804; G11C 2029/4402; G11C 29/789; G11C 29/702; G11C 29/787; G11C 29/025; G11C 29/72
See application file for complete search history.

(56) References Cited

U.S. PATENT DOCUMENTS

| | | |
|---|---|---|
| 6,181,614 B1 | 1/2001 | Aipperspach et al. |
| 6,888,731 B2 | 5/2005 | Roth et al. |
| 11,069,426 B1 | 7/2021 | Wieduwilt et al. |
| 2003/0097626 A1 | 5/2003 | Tseng et al. |

(Continued)

FOREIGN PATENT DOCUMENTS

| | | |
|---|---|---|
| KR | 2002-0002913 A | 1/2002 |
| KR | 10-2004-0025476 A | 3/2004 |

OTHER PUBLICATIONS

Communication dated Apr. 26, 2024, issued by the European Patent Office in counterpart European Application No. 24154391.7.

*Primary Examiner* — Mohammed A Bashar
(74) *Attorney, Agent, or Firm* — Sughrue Mion, PLLC

(57) ABSTRACT

A repair circuit, including a first fail address latch configured to latch a first fail address and a second fail address corresponding to a first bank; a second fail address latch configured to latch a third fail address and a fourth fail address corresponding to a second bank different from the first bank; a fail address multiplexer configured merge the first fail address and the third fail address into a first merge address, and to merge the second fail address and the fourth fail address into a second merge address; a comparison circuit configured to compare the first and second merge addresses with merged decoded row addresses to generate first and second hit signals; a logic operator configured to output a valid hit pre-signal based on the first and second hit signals; and a valid hit latch configured output a valid hit signal based on the valid hit pre-signal.

20 Claims, 15 Drawing Sheets

(56) References Cited

U.S. PATENT DOCUMENTS

2013/0223171 A1* 8/2013 Kim .................... G11C 29/789
  365/200
2018/0130547 A1   5/2018 Lee et al.
2019/0378551 A1* 12/2019 Kim .................... G06F 11/2094

* cited by examiner

MEMORY DEVICE INCLUDING REPAIR CIRCUIT AND OPERATING METHOD THEREOF

CROSS-REFERENCE TO RELATED APPLICATION

This application is based on and claims priority under 35 USC § 119 to Korean Patent Application No. 10-2023-0013879, filed on Feb. 1, 2023, in the Korean Intellectual Property Office, the disclosure of which is incorporated by reference herein in its entirety.

BACKGROUND

1. Field

The disclosure relates to an electronic device, and more particularly, to a memory device including a repair circuit and an operating method thereof.

2. Description of Related Art

Memory devices may be used in electronic devices, such as mobile devices and computers. The memory capacity of memory devices has increased with the development of manufacturing process technology. As microfabrication technology has developed, fail memory cells have gradually increased in memory devices. Memory devices may include a repair circuit to repair fail memory cells.

Based on an increase in memory capacity, the size of memory cell arrays in memory devices may also increase. In a memory device, an aggregate including a memory cell array may be referred to as a bank. Repair circuits may be provided to drive corresponding banks. When circuits storing fail addresses are arranged in the repair circuits, the area of the memory device may increase.

SUMMARY

Provided is a memory device including a repair circuit, in which a row repair circuit is merged in every two memory banks, thereby reducing size and power consumption, and an operating method thereof.

Additional aspects will be set forth in part in the description which follows and, in part, will be apparent from the description, or may be learned by practice of the presented embodiments.

In accordance with an aspect of the disclosure, a repair circuit includes a first fail address latch configured to latch a first fail address and a second fail address corresponding to a first bank; a second fail address latch configured to latch a third fail address and a fourth fail address corresponding to a second bank which is different from the first bank; a fail address multiplexer configured to output a first merge address by merging the first fail address with the third fail address, and to output a second merge address by merging the second fail address with the fourth fail address; a comparison circuit configured to compare a logic level of the first merge address with logic levels of merged decoded row addresses to generate a first hit signal, and to compare a logic level of the second merge address with the logic levels of the merged decoded row addresses to generate a second hit signal; a logic operator configured to receive the first hit signal and the second hit signal, and to output a valid hit pre-signal; and a valid hit latch configured to receive the valid hit pre-signal and to output a valid hit signal.

In accordance with an aspect of the disclosure, a memory device includes a merged bank including memory cells coupled to a plurality of word lines; a row decoder configured to transmit a row select signal through the plurality of word lines and to select at least one word line of the merged bank; and a repair circuit configured to repair a fail address corresponding to the selected word line, wherein the merged bank includes a first bank and a second bank, and wherein the repair circuit includes: a first fail address latch configured to latch a first fail address and a second fail address corresponding to the first bank; a second fail address latch configured to latch a third fail address and a fourth fail address corresponding to the second bank; a fail address multiplexer configured to output a first merge address by merging the first fail address with the third fail address, and to output a second merge address by merging the second fail address with the fourth fail address; a comparison circuit configured to compare a logic level of the first merge address with logic levels of merged decoded row addresses to generate a first hit signal, and to compare a logic level of the second merge address with logic levels of the merged decoded row addresses to generate a second hit signal; a logic operator configured to receive the first hit signal and the second hit signal, and to output a valid hit pre-signal; and a valid hit latch configured to receive the valid hit pre-signal and to output a valid hit signal.

In accordance with an aspect of the disclosure, an operating method of a memory device including a repair circuit for repairing addresses of two or more merged banks, the operating method includes: receiving a first fail address pre-signal of a first bank and obtaining a first fail address; receiving a second fail address pre-signal of a second bank and obtaining a second fail address; receiving a third fail address pre-signal of a third bank and obtaining a third fail address, receiving a third fail address pre-signal of a fourth bank and obtaining a fourth fail address; generating a first merge address based on the first fail address and the second fail address, generating a second merge address based on the third fail address and the fourth fail address; generating a first hit signal by comparing a logic level of a first merged decoded row address with a logic level of the first merge address; generating a second hit signal by comparing a logic level of a second merged decoded row address with a logic level of the second merge address; generating a valid hit pre-signal based on the first hit signal and the second hit signal; and outputting a valid hit signal based on the valid hit pre-signal.

In accordance with an aspect of the disclosure, a repair circuit includes: a first fail address latch configured to latch a first fail address corresponding to a first bank; a second fail address latch configured to latch a second fail address corresponding to a second bank different from the first bank; a first fail address multiplexer configured to receive the first fail address and the second fail address, and to output a first merge address by merging the first fail address and the second fail address; a first comparison circuit configured to compare logic levels of merged decoded row addresses with a logic level of the first merge address to generate a first hit signal; a third fail address latch configured to latch a third fail address corresponding to the first bank; a fourth fail address latch configured to latch a fourth fail address corresponding to the second bank; a second fail address multiplexer configured to receive the third fail address and the fourth fail address and to output a second merge address by merging the first fail address and the second fail address; a second comparison circuit configured to compare the logic levels of the merged decoded row addresses with a logic level of the second merge address to generate a second hit signal; a logic operator configured to receive the first hit signal and the second hit signal and to output a valid hit pre-signal; and a valid hit latch configured to receive the valid hit pre-signal and to output a valid hit signal.

In accordance with an aspect of the disclosure, a repair circuit includes: a first fail address latch configured to latch a first fail address and a second fail address corresponding to a first bank included in a plurality of banks; a second fail address latch configured to latch a third fail address and a fourth fail address corresponding to a second bank included in the plurality of banks, wherein the second bank is different from the first bank; a fail address multiplexer configured to output a first merge address by merging the first fail address and the third fail address, and to output a second merge address by merging the second fail address and the fourth fail address; a comparison circuit configured to compare a logic level of the first merge address with logic levels of merged decoded row addresses to generate a first hit signal, and to compare a logic level of the second merge address with the logic levels of the merged decoded row addresses to generate a second hit signal; a logic operator configured to receive the first hit signal and the second hit signal and to output a valid hit pre-signal; and a valid hit latch configured to receive the valid hit pre-signal and to output a valid hit signal based on the valid hit pre-signal.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF THE EMBODIMENTS

Figure 1:
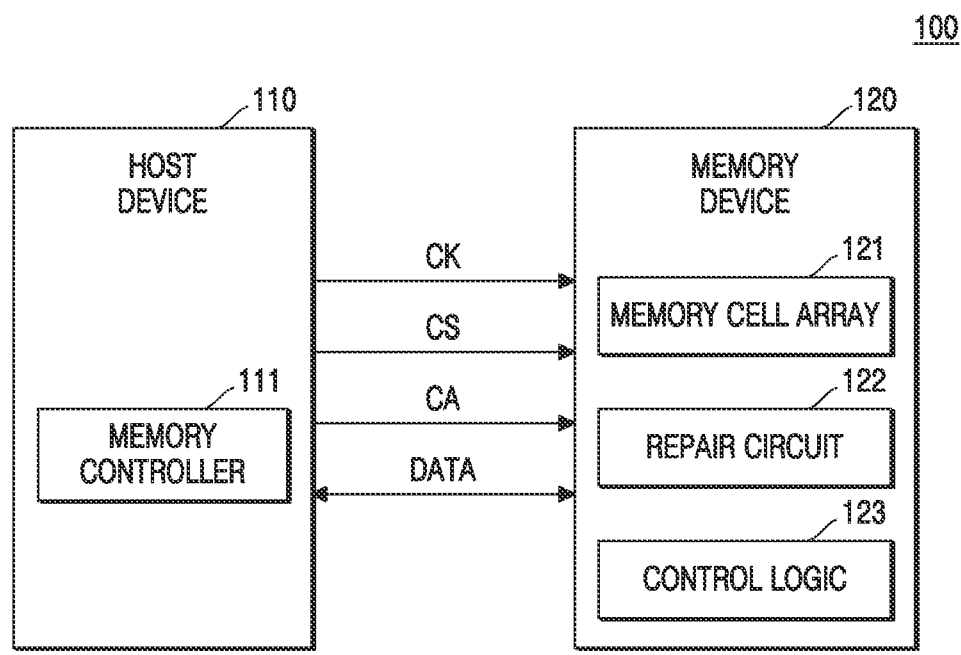
FIG. 1 is a diagram illustrating an electronic device according to embodiments.

Hereinafter, embodiments will be described in detail with reference to the accompanying drawings.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a diagram illustrating an electronic device 100 according to embodiments.

Referring to FIG. 1, the electronic device 100 may include computing systems, such as computers, laptop computers, servers, workstations, portable communication terminals, personal digital assistants (PDAs), portable multimedia players (PMPs), smartphones, and wearable devices. The electronic device 100 may include a host device 110 and a memory device 120.

The host device 110 may be included in, or may include some components included in, a computing system such as a graphics card. The host device 110 may be communicatively connected to the memory device 120 through a memory bus.

The host device 110 may perform general computer operations in the electronic device 100, and may include at least one of a central processing unit (CPU), a digital signal processor (DSP), a graphics processing unit (GPU), and an application processor (AP). The host device 110 may include a memory controller 111 that controls data transmission/reception to or from the memory device 120. The host device 110 may be referred to as a host.

In some embodiments, the memory controller 111 may provide to the host 110 access to the memory device 120 through the memory bus. In an embodiment, access may include an active command and a row address. However, embodiments are not limited thereto, and the access may further include a write command or a read command, a column address, and a precharge command.

In an embodiment, the memory controller 111 may sequentially output accesses. When an access includes an active command and a row address, the memory controller 111 may sequentially output a plurality of active commands and a plurality of row addresses.

In some embodiments, the memory controller 111 may periodically output a refresh command. The refresh command may be a command instructing the memory device 120 to perform a refresh operation.

The memory controller 111 may access the memory device 120 according to a memory request of the host device 110. The memory controller 111 may include a memory physical layer interface PHY for interfacing with the memory device 120, such as selecting rows and columns corresponding to memory locations, writing data to or reading data from memory locations, and the like. The memory physical layer interface PHY may include a physical or electrical layer and a logical layer provided for signals, frequency, timing, driving, detailed operating parameters, and functionality required for efficient communication between the memory controller 111 and the memory device 120. The memory physical layer interface PHY may support features of double data rate (DDR) and/or low power DDR (LPDDR) protocols of the Joint Electron Device Engineering Council (JEDEC) standard.

The memory controller 111 may be connected to the memory device 120 through the memory bus. Although FIG. 1 shows that each of a clock CK, a command/address signal CA, a chip select signal CS, and data DATA is provided through a single signal line, in some embodiments the clock CK the command/address signal CA, the chip select signal CS, and the data DATA may be provided through a plurality of signal lines or a bus. Signal lines between the memory controller 111 and the memory device 120 may be connected through connectors. The connectors may be implemented as pins, balls, signal lines, or other hardware components.

The clock signal CK may be transmitted from the memory controller 111 to the memory device 120 through a clock signal line of a memory bus. The command/address signal CA may be transmitted from the memory controller 111 to the memory device 120 through a command/address signal line of the memory bus. The chip select signal CS may be transmitted from the memory controller 111 to the memory device 120 through a chip select line of the memory bus. For example, a signal transmitted through a command/address signal line when the chip select signal CS is activated to be logic high may be a command. The data DATA may be transmitted from the memory controller 111 to the memory device 120 or from the memory device 120 to the memory controller 111 through a data bus including bidirectional signal lines of the memory bus.

The memory device 120 may write data DATA or read data DATA and perform a refresh operation under the control of the memory controller 111. For example, the memory device 120 may be a DDR synchronous dynamic random access memory (SDRAM) device. However, embodiments are not limited thereto, and the memory device 120 may be any one of volatile memory devices, such as LPDDR SDRAM, wide input/output (I/O) dynamic random access memory (DRAM), high bandwidth memory (HBM), and hybrid memory cube (HMC). A row address received by the memory device 120 from the memory controller 111 may be referred to as an input row address.

The memory device 120 may include a memory cell array 121, a repair circuit 122, and a control logic 123, which may be for example a control circuit.

The memory cell array 121 may include a plurality of word lines, a plurality of bit lines, and a plurality of memory cells. The plurality of memory cells may be formed at points where word lines intersect with bit lines. The memory cells of the memory cell array 121 may be volatile memory cells, such as DRAM cells.

By merging the repair circuit 122 for every two memory banks, the chip size of a memory device may decrease and yield may be improved. In embodiments, two memory banks may be referred to as a pair of memory banks. Accordingly, the repair circuit 122 which is merged for every two memory banks may also be referred to as being merged for each pair of memory banks. A configuration of the repair circuit 122 in some embodiments is described below in detail with reference to FIG. 3. The configuration of the repair circuit 122 in other embodiments is described below in detail with reference to FIG. 5.

Figure 2:
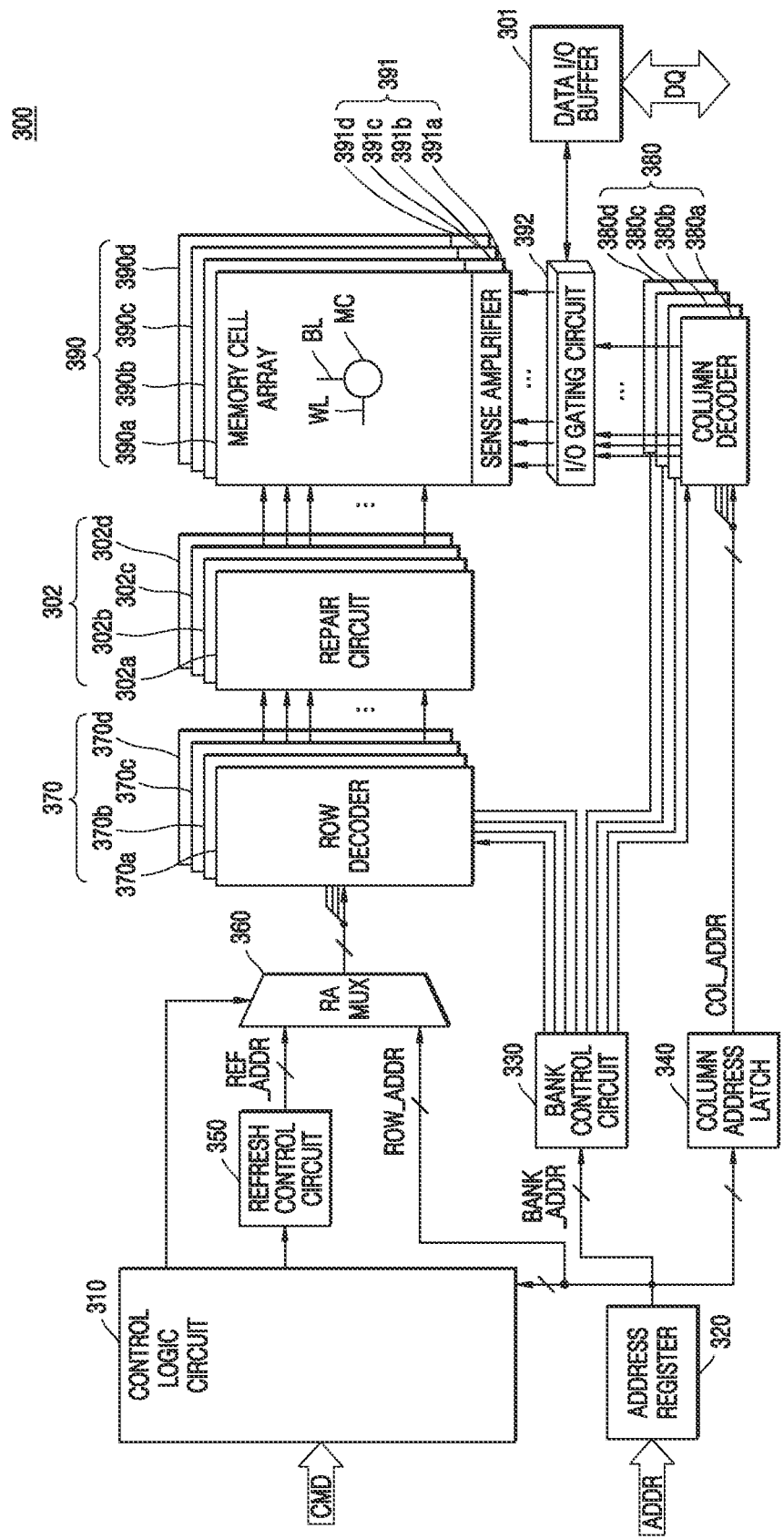
FIG. 2 is a diagram illustrating a memory device according to embodiments.

FIG. 2 is a diagram illustrating a memory device 300 according to embodiments.

Referring to FIG. 2, the memory device 300 may correspond to the memory device 120 shown in FIG. 1.

The memory device 300 may include a control logic circuit 310, an address register 320, a bank control circuit 330, a column address latch 340, a refresh control circuit 350, a row address (RA) multiplexer (MUX) 360, a row decoder 370, a column decoder 380, a memory cell array 390, a sense amplifier 391, an I/O gating circuit 392, a data I/O buffer 301, and a repair circuit 302.

The memory cell array 390 may include first to fourth bank arrays 390a to 390d. Each of the first to fourth bank arrays 390a to 390d may include a memory cell MC formed at a point where a word line WL intersects with a bit line BL. The number of memory cells MC may be plural. Each of the first to fourth bank arrays 390a to 390d may include a plurality of pages including memory cell rows respectively connected to the word lines WL.

The repair circuit 302 may include first to fourth bank repair circuits 302a to 302d respectively connected to the first to fourth bank arrays 390a to 390d.

The row decoder 370 may include first to fourth bank row decoders 370a to 370d respectively connected to the first to fourth bank arrays 390a to 390d. Also, the row decoder 370 may include first to fourth bank row decoders 370a to 370d respectively connected to the first to fourth bank repair circuits 302a to 302d.

The column decoder 380 may include first to fourth bank column decoders 380a to 380d respectively connected to the first to fourth bank arrays 390a to 390d.

The sense amplifier 391 may include first to fourth bank sense amplifiers 391a to 391d respectively connected to the first to fourth bank arrays 390a to 390d.

The first to fourth bank arrays 390a to 390d, the first to fourth bank sense amplifiers 391a to 391d, the first to fourth bank column decoders 380a to 380d, and the first to fourth bank row decoders 370a to 370d may be referred to as first to fourth banks, respectively. For example, a first bank may include the first bank array 390a, the first bank sense amplifier 391a, the first bank column decoder 380a, and the first bank row decoder 370a. Similarly, a second bank may include the second bank array 390b, the second bank sense amplifier 391b, the second bank column decoder 380b, and the second bank row decoder 370b, and so on. FIG. 2 illustrates the memory cell array 390 as including four banks, but embodiments are not limited thereto. For example, according to embodiments, the memory cell array 390 may include any number of banks.

The address register 320 may provide an address ADDR including a bank address BANK_ADDR, a row address ROW_ADDR, and a column address COL_ADDR. The address register 320 may provide the bank address BANK_ADDR to the bank control circuit 330. The address register 320 may provide the row address ROW_ADDR to the RA MUX 360. The address register 320 may provide the column address COL_ADDR to the column address latch 340.

The bank control circuit 330 may generate bank control signals in response to the bank address BANK_ADDR. The bank control signals may be provided to the first to fourth bank row decoders 370a to 370d and the first to fourth bank column decoders 380a to 380d. Among the first to fourth bank row decoders 370a to 370d, a bank row decoder corresponding to the bank address BANK_ADDR may be activated. Among the first to fourth bank column decoders 380a to 380d, a bank column decoder corresponding to the bank address BANK_ADDR may be activated.

The refresh control circuit 350 may generate a refresh row address REF_ADDR for refreshing a plurality of memory cell rows included in the memory cell array 390 under the control of the control logic circuit 310. The refresh control circuit 350 may be included in the memory device 300 when the memory cells MC of the memory cell array 390 are configured as dynamic memory cells.

The RA MUX 360 may receive the row address ROW_ADDR from the address register 320 and receive the refresh row address REF_ADDR from the refresh control circuit 350. The RA MUX 36) may selectively output, as a row address, the row address ROW_ADDR or the refresh row address REF_ADDR. The row address may be applied to each of the first to fourth bank row decoders 370a to 370d.

Among the first to fourth bank row decoders 370a to 370d, a bank row decoder activated by the bank control circuit 330 may decode the row address output from the RA MUX 360 to activate a word line corresponding to the row address. For example, the activated bank row decoder may apply a word line driving voltage to the word line corresponding to the row address.

The column address latch 340 may receive the column address COL_ADDR from the address register 320 and temporarily store the received column address COL_ADDR. Also, the column address latch 340 may gradually or progressively increase the received column address COL_ADDR in a burst mode. The column address latch 340 may apply the temporarily stored or gradually increased column address COL_ADDR to each of the first to fourth bank column decoders 380a to 380d.

Among the first to fourth bank column decoders 380a to 380d, a bank column decoder activated by the bank control circuit 330 may activate a sense amplifier corresponding to the bank address BANK_ADDR and the column address COL_ADDR through the I/O gating circuit 392.

The I/O gating circuit 392 may include circuits for gating data, input data mask logic, data latches, and write drivers.

Data provided to the data I/O buffer 301 may be written into the first to fourth bank arrays 390a to 390d through the write drivers. Data read or written through the data I/O buffer 301 may be input or output in units of bursts.

The control logic circuit 310 may control the overall operation of the memory device 300. For example, the control logic circuit 310 may generate control signals instructing to perform a write operation or a read operation. In another example, the control logic circuit 310 may generate control signals instructing to perform a refresh operation.

Figure 3:
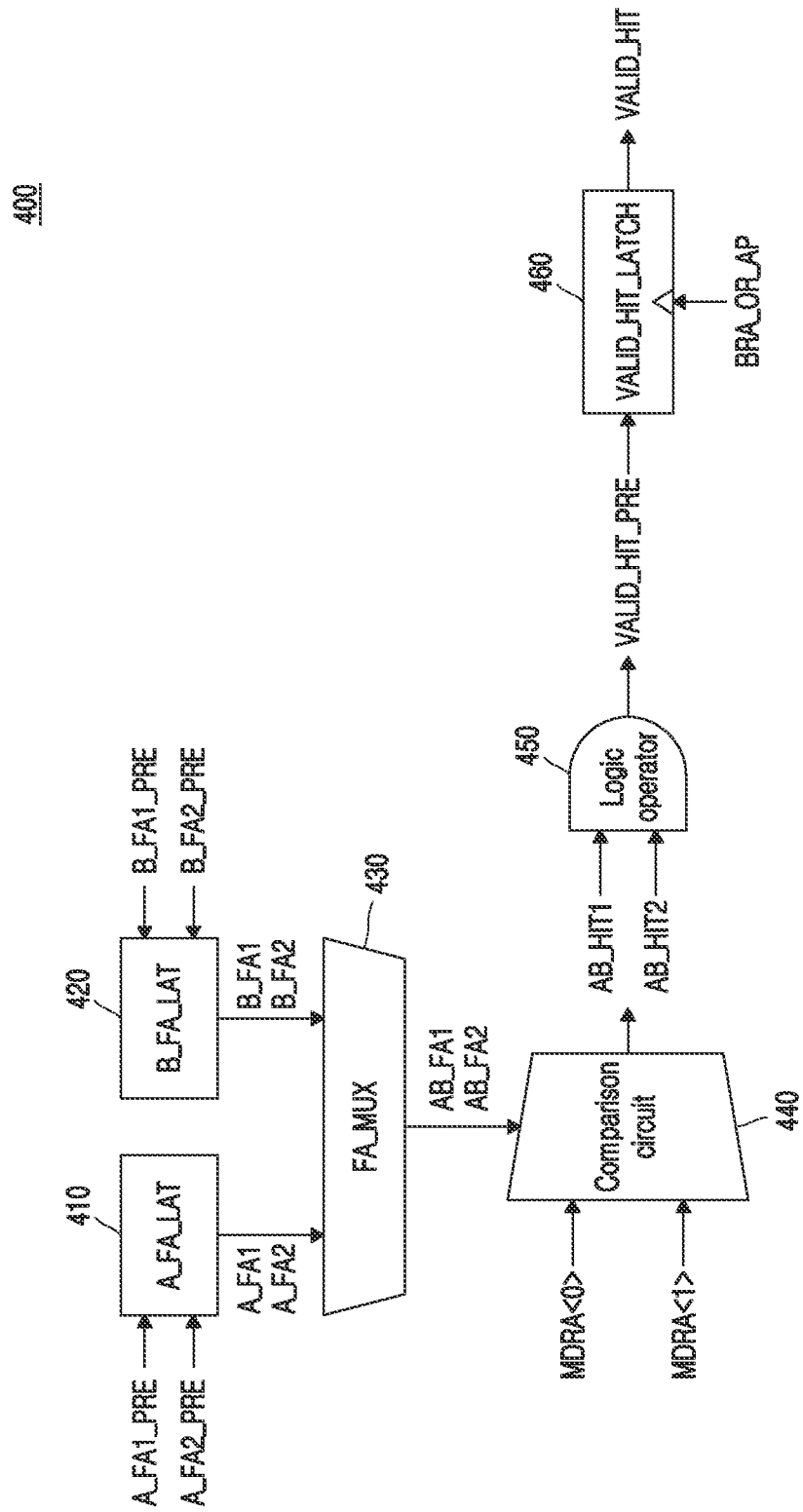
FIG. 3 is a diagram illustrating a repair circuit according to embodiments.

FIG. 3 is a diagram illustrating a repair circuit 400 according to embodiments.

Referring to FIG. 3, the repair circuit 400 may include a first fail address latch 410 (illustrated as "A_FA_LAT"), a second fail address latch 420 (illustrated as "B_FA_LAT"), a fail address multiplexer 430 (illustrated as "FA_MUX"), a comparison circuit 440, a logic operator 450, and a valid hit latch 460 (illustrated as "VALID_HIT_LATCH"). In embodiments, the repair circuit 400 may correspond to one or more of the repair circuits 302, for example one or more of the repair circuit 302a, the repair circuit 302b, the repair circuit 302c, and the repair circuit 302d.

A first bank and a second bank may share the fail address multiplexer 430, the comparison circuit 440, the logic operator 450, and the valid hit latch 460. By merging the fail address multiplexer 430 and the comparison circuit 440 for the first bank and the second bank, an area of a memory chip may decrease and yield may increase.

The first fail address latch 410 may latch first to n-th fail addresses (where n is a natural number greater than or equal to 2) corresponding to the first bank. For example, when the number of rows in the first bank is 16, the first fail address latch 410 may latch first to sixteenth fail addresses. FIG. 3 illustrates an example in which the first fail address latch 410 latches first fail address A_FA1 and second fail address A_FA2, but embodiments are not limited thereto.

The first fail address latch 410 may include an anti-fuse array including a plurality of anti-fuse cells. An example of an anti-fuse array is described in detail with reference to FIG. 4 below.

The first fail address latch 410 may receive a first fail address pre-signal A_FA1_PRE and a second fail address pre-signal A_FA2_PRE. For example, the first fail address latch 410 may receive the first fail address pre-signal A_FA1_PRE and output the first fail address A_FA1 corresponding to a first anti-fuse cell, among a plurality of anti-fuse cells. The first fail address latch 410 may receive the second fail address pre-signal A_FA2_PRE and output the second fail address A_FA2 corresponding to the second anti-fuse cell, among a plurality of anti-fuse cells.

The second fail address latch 420 may latch first to n-th fail addresses (where n is a natural number greater than or equal to 2) of a second bank, different from the first bank. For example, when the number of rows in the second bank is 16, the first fail address latch 410 may latch first to sixteenth fail addresses. FIG. 3, illustrates an example in which the second fail address latch 420 latches the third fail address B_FA1 and the fourth fail address B_FA2, but embodiments are not limited thereto. The second fail address latch 420 may include an anti-fuse array including a plurality of anti-fuse cells.

The second fail address latch 420 may receive a first fail address pre-signal B_FA1_PRE and a second fail address pre-signal B_FA2_PRE. For example, the second fail address latch 420 may receive the first fail address pre-signal A_FA1_PRE and output the third fail address B_FA1 corresponding to the second anti-fuse cell among the plurality of anti-fuse cells. The second fail address latch 420 may receive the second fail address pre-signal B_FA1_PRE and output the fourth fail address B_FA2 corresponding to the second anti-fuse cell among the plurality of anti-fuse cells.

The fail address multiplexer 430 may receive a first fail address A_FA1 corresponding to the first bank and a third fail address B_FA1 corresponding to the second bank. The fail address multiplexer 430 may merge the received first and third fail addresses A_FA1 and B_FA1 and output a first merge address AB_FA1. In embodiments, the first fail address A_FA1 and the third fail address B_FA1 may have the same row address.

The fail address multiplexer 430 may receive a second fail address A_FA2 corresponding to the first bank and a fourth fail address B_FA2 corresponding to the second bank. The fail address multiplexer 430 may merge the received second fail address A_FA2 and the fourth fail address B_FA2 and output the second merge address AB_FA2. The second fail address A_FA2 and the fourth fail address B_FA2 may have the same row address.

The fail address multiplexer 430 may further receive a row address active signal A_BRA corresponding to the first bank and a row address active signal B_BRA corresponding to the second bank. Here, the row address active signal A_BRA corresponding to the first bank may be a signal including information on an active (or activated) row address of the first bank. The row address active signal B_BRA corresponding to the second bank may be a signal including information on an active (or activated) row address of the second bank.

The fail address multiplexer 430 may receive the row address active signal A_BRA corresponding to the first bank, the row address active signal B_BRA corresponding to the second bank, the first fail address A_FA1 corresponding to the first bank, and the third fail address B_FA1 corresponding to the second bank, and output a first merge address AB_FA1 based thereon.

The fail address multiplexer 430 may receive the row address active signal A_BRA corresponding to the first bank, the row address active signal B_BRA corresponding to the second bank, the second fail address A_FA2 corresponding to the first bank, and the fourth fail address B_FA2 corresponding to the second bank and output a second merge address AB_FA2 based thereon.

The comparison circuit 440 may receive the first merge address AB_FA1 and the second merge address AB_FA2 output from the fail address multiplexer 430. The comparison circuit 440 may further receive merged decoded row addresses MDRA<0> and MDRA<1>.

In response to a logic level of the first merge address AB_FA1, the comparison circuit 440 may compare logic levels of the merged decoded row addresses MDRA<0> and MDRA<1> to generate a first hit signal AB_HIT1. When the logic levels of the merged decoded row addresses MDRA<0> and MDRA<1> match the logic level of the first merge address AB_FA1, the comparison circuit 440 may generate the first hit signal AB_HIT1.

For example, when the logic level of the merged decoded row address MDRA<0> is high, the logic level of the merged decoded row address MDRA<1> is low, and the logic level of the first merge address AB_FA1 is high, the first hit signal AB_HIT1 may then be generated. When the logic level of the merged decoded row address MDRA<0> matches the logic level of the first merge address AB_FA1, the first hit signal AB_HIT1 may be generated. When the logic level of the merged decoded row address MDRA<0> is low, the logic level of the merged decoded row address MDRA<1> is high, and the logic level of the first merge address AB_FA1 is high, then, the first hit signal AB_HIT1 may not be generated. When the logic level of the merged decoded row address MDRA<1> matches the logic level of the first merge address AB_FA1, the first hit signal AB_HIT1 may be generated.

In response to a logic level of the second merge address AB_FA2, the comparison circuit 440 may compare logic levels of the merged decoded row addresses MDRA<0> and MDRA<1> to generate a second hit signal AB_HIT2. When the logic levels of the merged decoded row addresses MDRA<0> and MDRA<1> match the logic level of the second merge address AB_FA2, the comparison circuit 440 may generate the second hit signal AB_HIT2.

For example, when the logic level of the merged decoded row address MDRA<0> is high, the logic level of the merged decoded row address MDRA<1> is low, and the logic level of the second merge address AB_FA2 is high, then, the second hit signal AB_HIT2 may be generated. When the logic level of the merged decoded row address MDRA<0> matches the logic level of the second merge address AB_FA2, the second hit signal AB_HIT2 may be generated. When the logic level of the merged decoded row address MDRA<0> is low, the logic level of the merged decoded row address MDRA<1> is high, and the logic level of the second merge address AB_FA2 is high, then, the second hit signal AB_HIT2 may not be generated. When the logic level of the merged decoded row address MDRA<1> matches the logic level of the second merge address AB_FA2, the second hit signal AB_HIT2 may be generated.

The logic operator 450 may generate the first hit signal AB_HIT1 and the second hit signal AB_HIT2. The logic operator 450 may receive the first hit signal AB_HIT1 and the second hit signal AB_HIT2, and output a valid hit pre-signal VALID_HIT_PRE. The logic operator 450 may be, or may include, an AND gate that performs an AND operation on the logic level of the first hit signal AB_HIT1 and the logic level of the second hit signal AB_HIT2. For example, the logic operator 450 may include a plurality of AND gates that perform an AND operation.

The valid hit latch 460 may receive a valid hit pre-signal VALID_HIT_PRE output from the logic operator 450. The valid hit latch 460 may further receive a valid hit filter signal BRA_OR_AP. The valid hit latch 460 may output a valid hit signal VALID_HIT based on the valid hit pre-signal VALID_HIT_PRE and the valid hit filter signal BRA_OR_AP. The valid hit latch 460 may output a valid hit signal VALID_HIT by filtering the valid hit pre-signal VALID_HIT_PRE.

Accordingly, by merging row repair circuits for every two memory banks, the chip size of the memory device may decrease and the yield may be improved.

Figure 4:
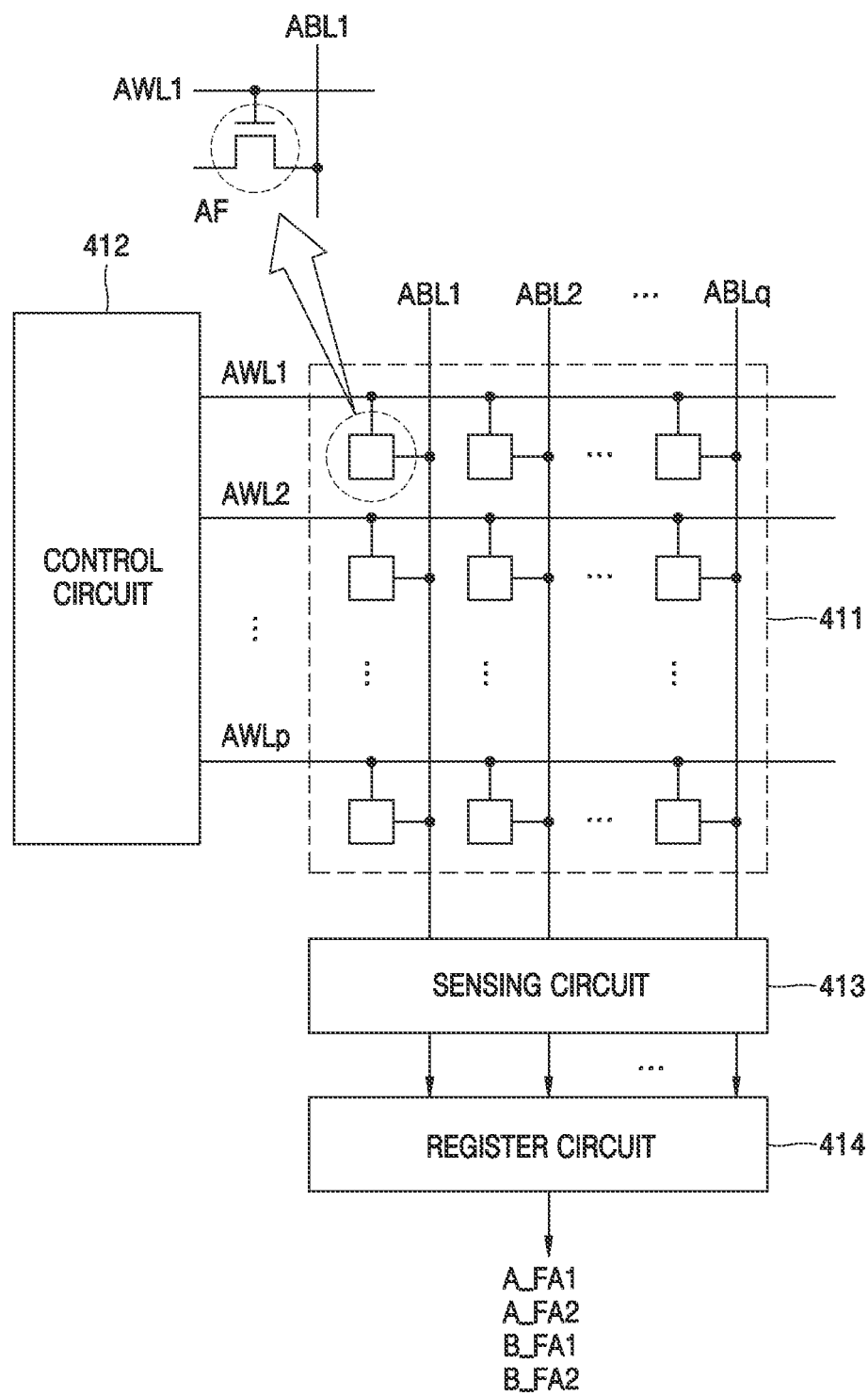
FIG. 4 is a diagram illustrating a fail address latch according to embodiments.

FIG. 4 is a diagram illustrating the first fail address latch 410 according to embodiments.

Referring to FIG. 4, the first fail address latch 410 may include an anti-fuse array 411, a control circuit 412, a sensing circuit 413, and a register circuit 414.

The anti-fuse array 411 may include p*q anti-fuses connected to intersections of p rows and q columns, respectively. The anti-fuse array 411 may include p word lines AWL1 to AWLp for accessing anti-fuses arranged in p rows and q bit lines ABL1 to ABLq arranged to correspond to the q columns to transfer information read from the anti-fuses.

The control circuit 412 may program location information of the fail cells to the anti-fuse array 411 or read the location information of the cells from the anti-fuse array 411. The sensing circuit 413 may sense/amplify and output the location information of the fail cells provided from the anti-fuse array 411. The register circuit 414 may temporarily store the location information of the fail cells provided from the sensing circuit 413. The register circuit 414 may output row address information and column address information of the fail cells. The register circuit 414 may output a first fail address A_FA1, a second fail address A_FA2, a third fail address B_FA1, and a fourth fail address B_FA2.

Although FIG. 4 illustrates the first fail address latch 410, other fail address latches such as the second fail address latch 420, a third fail address latch, and a fourth fail address latch may also be implemented with the same configuration.

Figure 5:
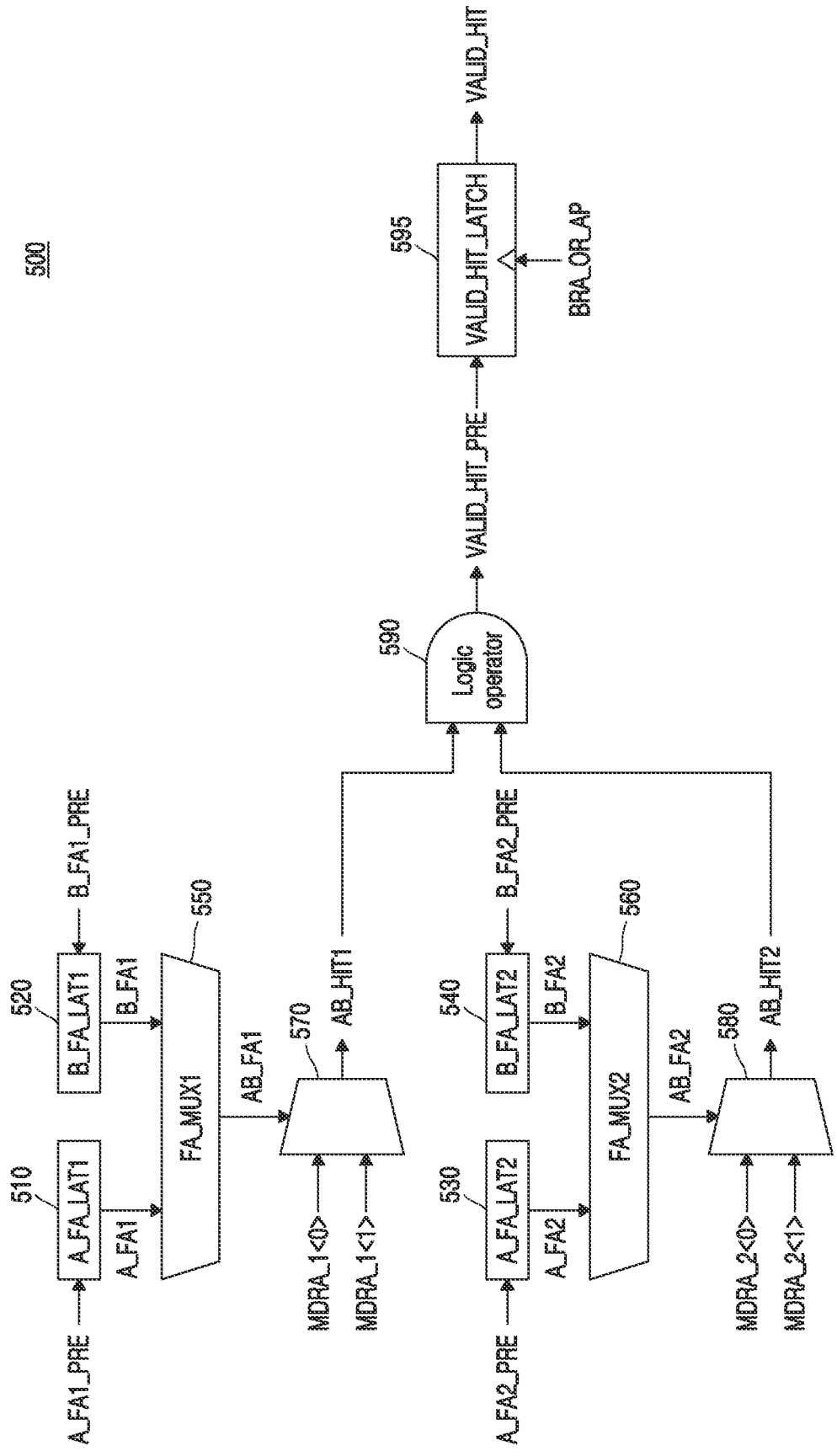
FIGS. 5 and 6 are diagrams illustrating repair circuits according to embodiments.
Figure 6:
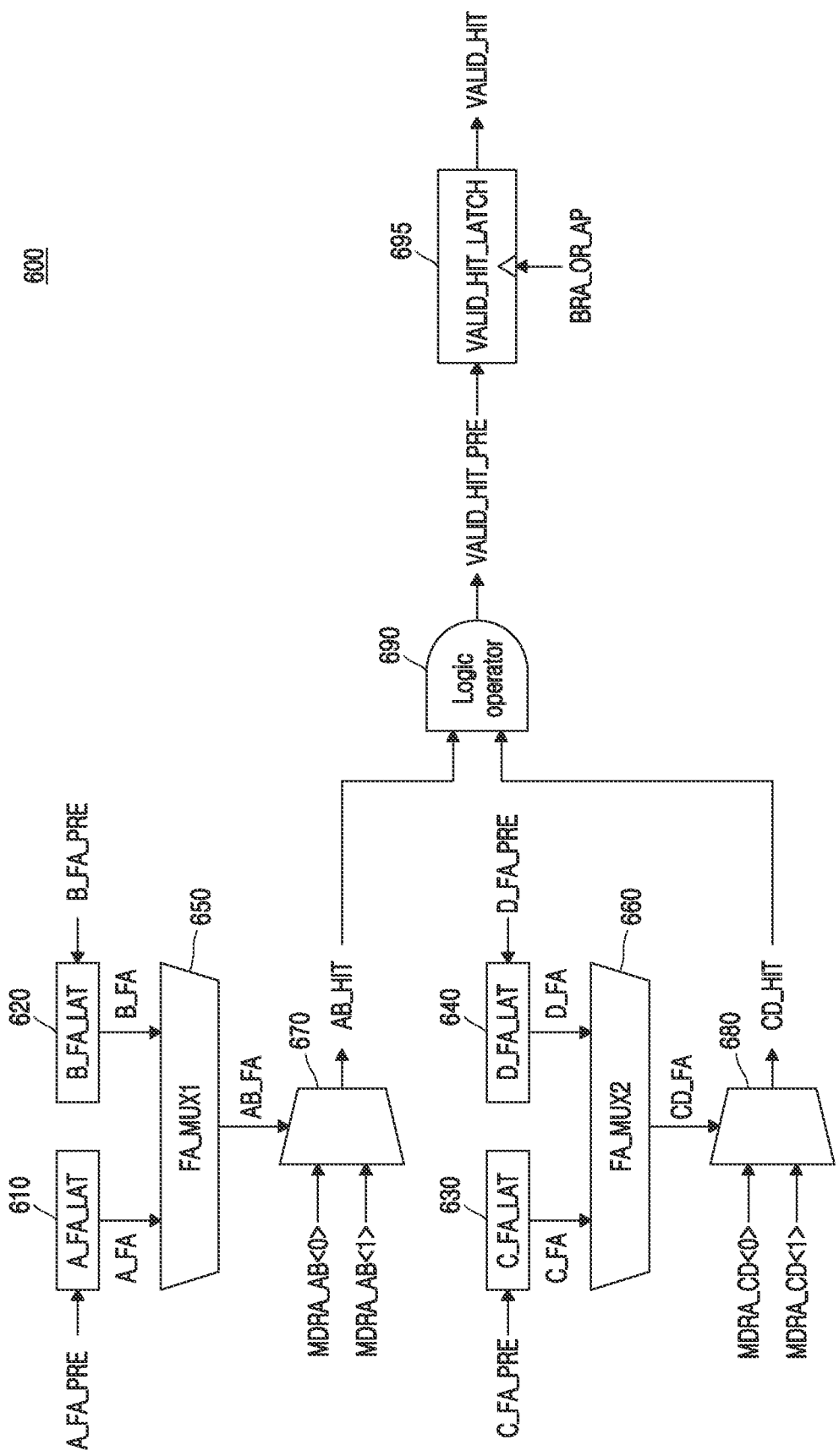

FIGS. 5 and 6 are diagrams illustrating repair circuits according to embodiments.

Referring to FIG. 5, the repair circuit 500 may include a first fail address latch 510 (illustrated as "A_FA_LAT1"), a second fail address latch 520 (illustrated as "B_FA_LAT1"), a first fail address multiplexer 550 (illustrated as "FA_MUX1"), a first comparison circuit 570, a third fail address latch 530 (illustrated as "A_FA_LAT2"), a fourth fail address latch 540 (illustrated as "B_FA_LAT2"), a second fail address multiplexer 560 (illustrated as "FA_MUX2"), a second comparison circuit 580, a logic operator 590, and a valid hit latch 595 (illustrated as " ").

Referring to FIG. 5, each row address may have a fail address latch and a comparison circuit. Some elements of the repair circuit 500 may be similar to the repair circuit 302 discussed above. Therefore, redundant or duplicative description with reference to FIG. 3 may be omitted.

The first bank and the second bank may share the logic operator 590 and the valid hit latch 595. By merging the logic operator 590 and the valid hit latch 595 for the first bank and the second bank, an area of a memory chip may decrease and yield may increase.

The first fail address latch 510 may latch the first fail address A_FA1 corresponding to the first bank. The first fail address latch 510 may store the first fail address A_FA1. The first fail address latch 510 may receive the first fail address pre-signal A_FA1_PRE. For example, the first fail address latch 510 may receive the first fail address pre-signal A_FA1_PRE and output the first fail address A_FA1 corresponding to a first anti-fuse cell among a plurality of anti-fuse cells.

The second fail address latch 520 may latch the third fail address B_FA1 corresponding to the second bank. The second fail address latch 420 may store the third fail address B_FA1. The second fail address latch 520 may receive the third fail address pre-signal B_FA1_PRE. For example, the second fail address latch 520 may receive the third fail address pre-signal B_FA1_PRE and output the third fail address B_FA1 corresponding to the second anti-fuse cell among the plurality of anti-fuse cells.

The first fail address A_FA1 corresponding to the first bank and the third fail address B_FA1 corresponding to the second bank may have the same row address. For example, the first fail address A_FA1 and the third fail address B_FA1 may be a first row address. The first row address may be an address capable of enabling the first word line.

The third fail address latch 530 may latch the second fail address A_FA2 corresponding to the first bank. The third fail address latch 530 may store the second fail address A_FA2. The third fail address latch 530 may receive the third fail address pre-signal A_FA2_PRE. For example, the third fail address latch 530 may receive the third fail address pre-signal A_FA2_PRE and output the third fail address A_FA2 corresponding to the first anti-fuse cell among the anti-fuse cells.

The fourth fail address latch 540 may latch the fourth fail address B_FA2 corresponding to the second bank. The fourth fail address latch 540 may store the fourth fail address B_FA2. The fourth fail address latch 540 may receive the fourth fail address pre-signal B_FA2_PRE. For example, the fourth fail address latch 540 may receive the fourth fail address pre-signal B_FA2_PRE and output the fourth fail address B_FA2 corresponding to the second anti-fuse cell among the anti-fuse cells.

The third fail address A_FA2 corresponding to the first bank and the fourth fail address B_FA2 corresponding to the second bank may have the same row address. For example, the third fail address A_FA2 and the fourth fail address B_FA2 may be a second row address. The second row address may be an address capable of enabling the second word line.

The first fail address latch 510, the second fail address latch 520, the third fail address latch 530, and the fourth fail address latch 540 may include an anti-fuse array including a plurality of anti-fuse cells. The anti-fuse array may be the same as that described above with reference to FIG. 4.

The first fail address multiplexer 550 may receive the first fail address A_FA1 corresponding to the first bank and the third fail address B_FA1 corresponding to the second bank. The first fail address multiplexer 550 may merge the received first fail address A_FA1 and the third fail address B_FA1 and output the first merge address AB_FA1.

The second fail address multiplexer 560 may receive the second fail address A_FA2 corresponding to the first bank and the fourth fail address B_FA2 corresponding to the second bank. The second fail address multiplexer 560 may merge the received second fail address A_FA2 and fourth fail address B_FA2 and output the second merge address AB_FA2.

The first fail address multiplexer 550 and the second fail address multiplexer 560 may further receive a row address active signal A_BRA corresponding to the first bank and a row address active signal B_BRA corresponding to the second bank.

The first fail address multiplexer 550 may receive the row address active signal A_BRA corresponding to the first bank, the row address active signal B_BRA corresponding to the second bank, the first fail address A_FA1 corresponding to the first bank, and the third fail address B_FA1 corresponding to the second bank and output the first merge address AB_FA1 based thereon.

The second fail address multiplexer 560 may receive the row address active signal A_BRA corresponding to the first bank, the row address active signal B_BRA corresponding to the second bank, the second fail address A_FA2 corresponding to the first bank, and the fourth fail address B_FA2 corresponding to the second bank and may output the second merge address AB_FA2 based thereon.

The first comparison circuit 570 may receive the first merge address AB_FA1 output from the first fail address multiplexer 550. The first comparison circuit 570 may further receive first merged decoded row addresses MDRA_1<0> and MDRA_1<1>. MDRA_k<0> and MDRA_k<1> may refer to a k-th merged decoded row address (k is an integer greater than or equal to 0), for example, MDRA_5<0> and MDRA_5<1> may be fifth merged decoded row addresses.

In response to a logic level of the first merge address AB_FA1, the first comparison circuit 570 may compare logic levels of the first merged decoded row addresses MDRA_1<0> and MDRA_1<1> to generate a first hit signal AB_HIT1. When the logic levels of the first merged decoded row addresses MDRA_1<0> and MDRA_1<1> match the logic level of the first merge address AB_FA1, the first comparison circuit 570 may generate the first hit signal AB_HIT1.

The second comparison circuit 580 may receive the second merge address AB_FA2 output from the second fail address multiplexer 560. The second comparison circuit 580 may further receive second merged decoded row addresses MDRA_2<0> and MDRA_2<1>.

In response to a logic level of the second merge address AB_FA2, the second comparison circuit 580 may compare logic levels of the second merged decoded row addresses MDRA_2<0> and MDRA_2<1> to generate a second hit signal AB_HIT2. When the logic levels of the second merged decoded row addresses MDRA_2<0> and MDRA_2<1> match the logic level of the second merge address AB_FA2, the second comparison circuit 580 may generate the second hit signal AB_HIT2.

The logic operator 590 may receive the first hit signal AB_HIT1 and the second hit signal AB_HIT2 and output a valid hit pre-signal VALID_HIT_PRE. The logic operator 590 may be an AND gate that performs an AND operation of the logic level of the first hit signal AB_HIT1 and the logic level of the second hit signal AB_HIT2.

The valid hit latch 595 may further receive the valid hit filter signal BRA_OR_AP. The valid hit latch 595 may output the valid hit signal VALID_HIT based on the valid hit pre-signal VALID_HIT_PRE and the valid hit filter signal BRA_OR_AP. The valid hit latch 595 may output the valid hit signal VALID_HIT by filtering the valid hit pre-signal VALID_HIT_PRE.

Accordingly, by merging row repair circuits for every two memory banks, the chip size of a memory device may decrease and yield may be improved.

Referring to FIG. 6, the repair circuit 600 may include a first fail address latch 610 (illustrated as "A_FA_LAT"), a second fail address latch 620 (illustrated as "B_FA_LAT"), a first fail address multiplexer 650 (illustrated as "FA_MUX1"), a first comparison circuit 670, a third fail address latch 630 (illustrated as "C_FA_LAT"), a fourth fail address latch 640 (illustrated as "D_FA_LAT"), a second fail address multiplexer 660 (illustrated as "FA_MUX2"), a second comparison circuit 680, a logic operator 690, and a valid hit latch 695.

In embodiments, the repair circuit 600 of FIG. 6 may be a repair circuit 600 of the first to fourth banks, while the repair circuit 500 of FIG. 5 may be a repair circuit of the first and second banks. Hereinafter, redundant or duplicative description with reference to FIG. 5 may be omitted.

Referring to FIG. 6, the first bank and the second bank may be merged and the third bank and the fourth bank may be merged. By merging the fail address multiplexer 650 and the first comparison circuit 670 for the first bank and the second bank, an area of the memory chip may decrease and yield may increase. By merging the fail address multiplexer 660 and the second comparison circuit 680 for the third bank and the fourth bank, the area of the memory chip may decrease and yield may increase.

Accordingly, by merging row repair circuits for every two memory banks, the chip size of a memory device may decrease and yield may be improved.

The first fail address latch 610 may latch a first fail address A_FA corresponding to the first bank and receive a first fail address pre-signal A_FA_PRE. The second fail address latch 620 may latch a second fail address B_FA corresponding to the second bank and receive a second fail address pre-signal B_FA_PRE. The second fail address latch 620 may latch a third fail address C_FA corresponding to the third bank and receive the third fail address pre-signal C_FA_PRE. The fourth fail address latch 640 may latch a fourth fail address D_FA corresponding to the fourth bank and receive a fourth fail address pre-signal D_FA_PRE.

The first fail address multiplexer 650 may receive the first fail address A_FA corresponding to the first bank and the second fail address B_FA corresponding to the second bank. The first fail address multiplexer 650 may merge the received first fail address A_FA and the second fail address B_FA to output a first merge address AB_FA. The second fail address multiplexer 660 may receive the third fail address C_FA corresponding to the third bank and the fourth fail address D_FA corresponding to the fourth bank. The second fail address multiplexer 660 may merge the received third fail address C_FA and fourth fail address D_FA to output a second merge address CD_FA.

The first comparison circuit 670 may receive the first merge address AB_FA output from the first fail address multiplexer 650. The first comparison circuit 670 may further receive first merged decoded row addresses MDRA_AB<0> and MDRA_AB<1>.

In response to a logic level of the first merge address AB_FA, the first comparison circuit 670 may compare logic levels of the first merged decoded row addresses MDRA_AB<0> and MDRA_AB<1> to generate a first hit signal AB_HIT. When the logic levels of the first merged decoded row addresses MDRA_AB<0> and MDRA_AB<1> match the logic level of the first merge address AB_FA, the first comparison circuit 670 may generate the first hit signal AB_HIT.

The second comparison circuit 680 may receive the second merge address CD_FA output from the second fail address multiplexer 660. The second comparison circuit 680 may further receive second merged decoded row addresses MDRA_CD<0> and MDRA_CD<1>.

In response to a logic level of the second merge address CD_FA, the second comparison circuit 680 may compare logic levels of the second merged decoded row addresses MDRA_CD<0> and MDRA_CD<1> to generate a second hit signal CD_HIT. When the logic levels of the second merged decoded row addresses MDRA_CD<0> and MDRA_CD<1> match the logic level of the second merge address CD_FA, the second comparison circuit 680 may generate the second hit signal CD_HIT.

FIGS. 7 to 11 are flowcharts illustrating an operating method of a repair circuit, according to embodiments.

Figure 7:
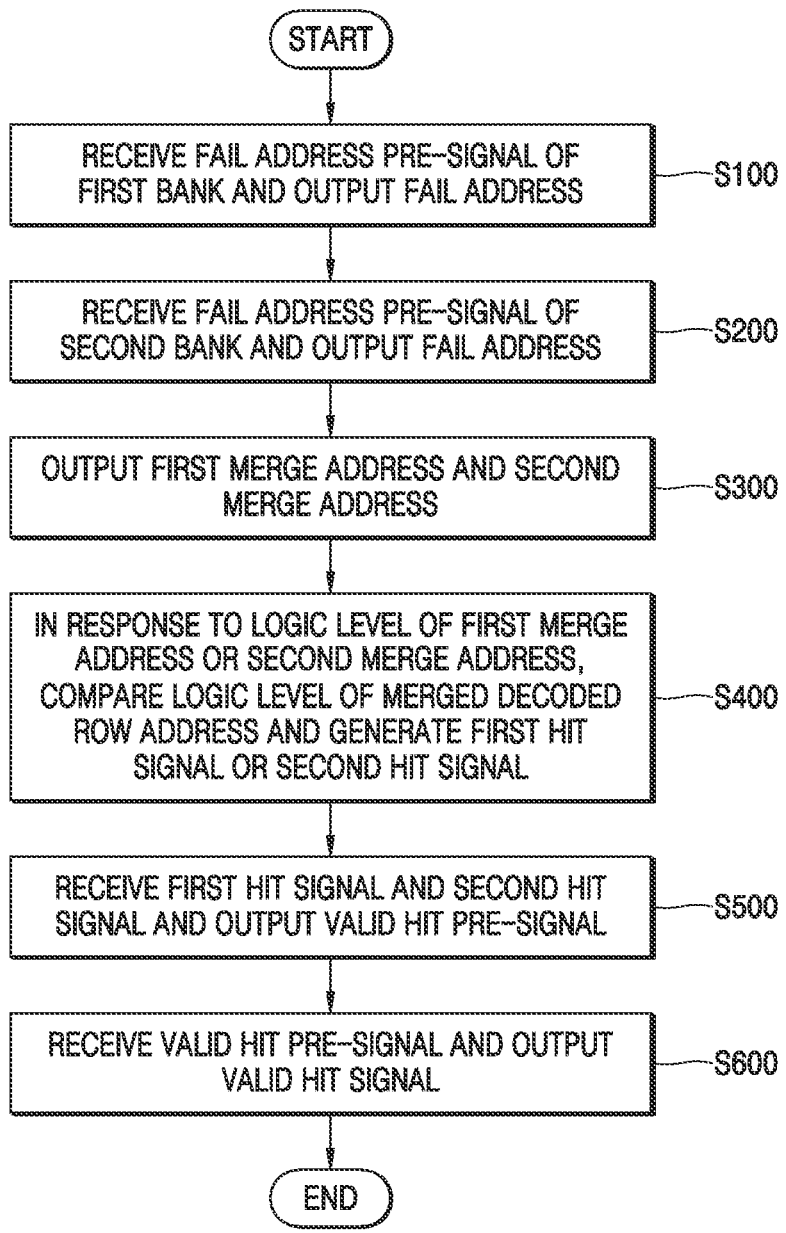
FIGS. 7 to 11 are flowcharts illustrating an operating method of a repair circuit, according to embodiments.

First, referring to FIG. 7, a first fail address latch may receive a fail address pre-signal of a first bank and output a fail address at operation S100.

A second fail address latch may receive a fail address pre-signal of a second bank and output a fail address at operation S200.

Figure 8:
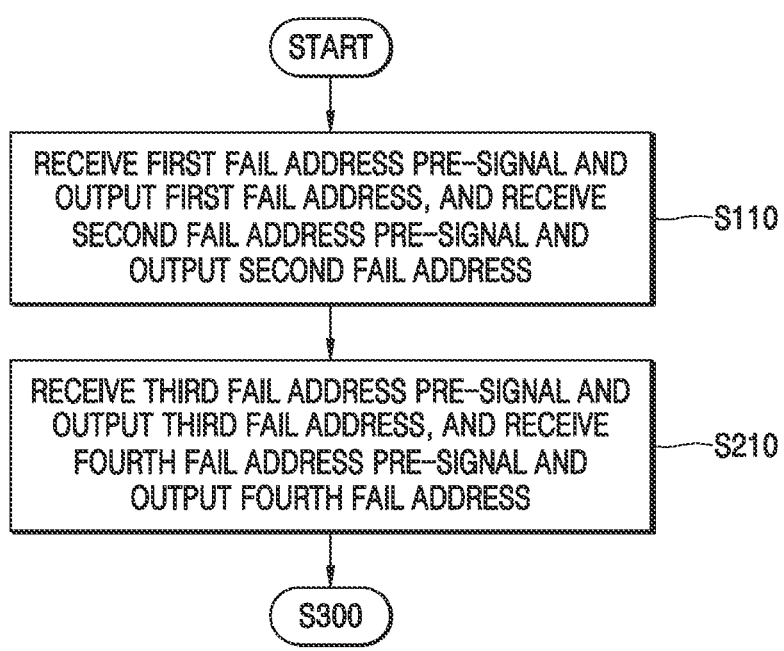

In an embodiment, referring to FIGS. 7 and 8, operation S100 may include operation S110 in which the first fail address latch receives a first fail address pre-signal to output a first fail address and receives a second fail address pre-signal to output a second fail address.

Operation S200 may include operation S210 in which the second fail address latch receives a third fail address pre-signal to output a third fail address and receives a fourth fail address pre-signal to output a fourth fail address.

For example, referring to FIG. 3, the first fail address latch 410 may receive the first fail address pre-signal A_FA1 PRE and the second fail address pre-signal A_FA2_PRE and output at least one of the first fail address A_FA1 and the second fail address A_FA2. The second fail address latch 420 may receive the third fail address pre-signal B_FA1_PRE and the fourth fail address pre-signal B_FA1_PRE and output at least one of the third fail address B_FA1 and the fourth fail address B_FA2.

For example, referring to FIG. 5, the first fail address latch 510 may receive the first fail address pre-signal A_FA1_PRE and output the first fail address A_FA1. The second fail address latch 520 may receive the third fail address pre-signal B_FA1_PRE and output the third fail address B_FA1. The third fail address latch 530 may receive the third fail address pre-signal A_FA2_PRE and output the third fail address A_FA2. The fourth fail address latch 540 may receive the fourth fail address pre-signal B_FA2_PRE and output the fourth fail address B_FA2.

Referring again to FIG. 7, the fail address multiplexer may output a first merge address and a second merge address at operation S300.

Figure 9:
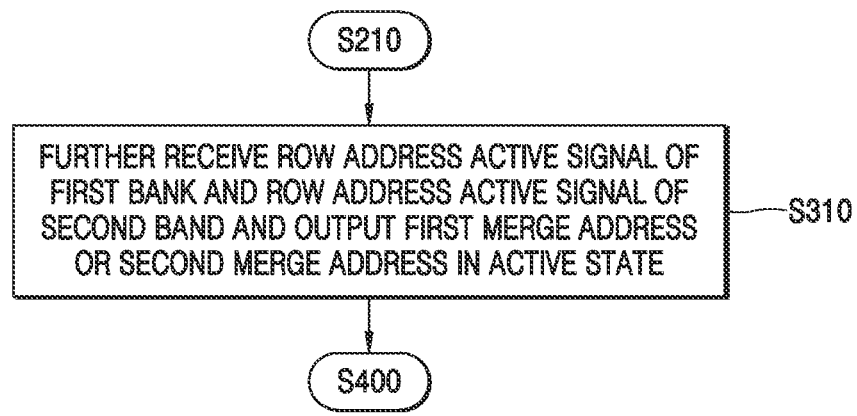

In an embodiment, referring to FIGS. 7 and 9, operation S300 may include operation S310 in which a row address active signal corresponding to the first bank and a row address active signal corresponding to the second bank are further received, and at least one of a first merge address and a second merge address are output in an active state.

For example, referring to FIG. 3, the fail address multiplexer 430 may merge the received first fail address A_FA1 and third fail address B_FA1 and output the first merge address AB_FA1. The fail address multiplexer 430 may merge the received second fail address A_FA2 and fourth fail address B_FA2 and output the second merge address AB_FA2.

For example, referring to FIG. 5, the first fail address multiplexer 550 may receive the row address active signal A_BRA corresponding to the first bank, the row address active signal B_BRA corresponding to the second bank, the first fail address A_FA1 corresponding to the first bank, and the third fail address B_FA1 corresponding to the second bank, and output the first merge address AB_FA1 based thereon. The second fail address multiplexer 560 may receive the row address active signal A_BRA corresponding to the first bank, the row address active signal B_BRA corresponding to the second bank, the second fail address A_FA2 corresponding to the first bank, and the fourth fail address B_FA2 corresponding to the second bank, and output the second merge address AB_FA2 based thereon.

Referring again to FIG. 7, in response to a logic level of the first merge address or the second merge address, the comparison circuit may compare a logic level of the merged decoded row address with the logic level of at least one of the first merge address and the second merge address and generate at least one of a first hit signal and a second hit signal at operation S400.

Figure 10:
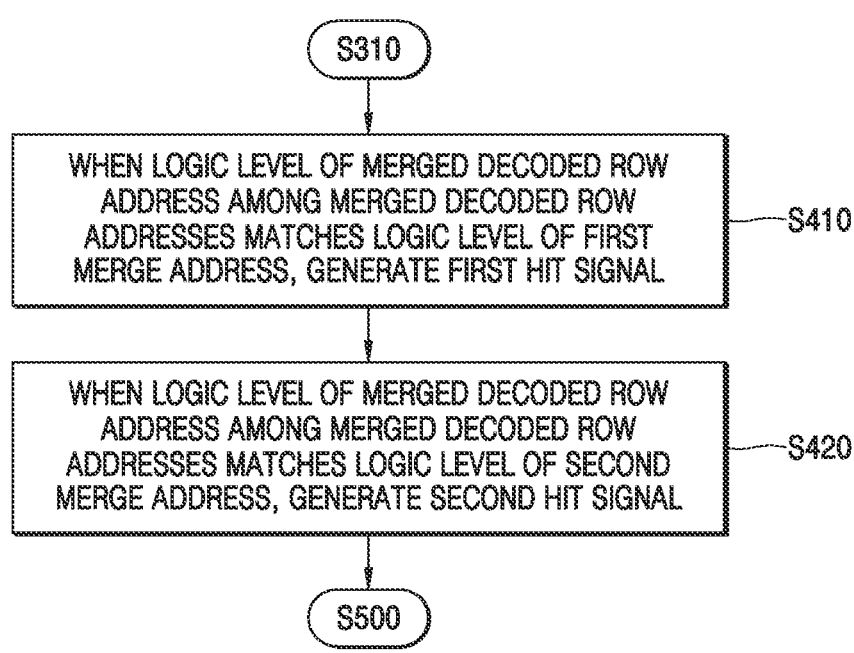

In an embodiment, referring to FIGS. 7 and 10, operation S400 may include operation S410 in which the first hit signal is generated when the logic level of the merged decoded row address among the merged decoded row addresses matches the logic level of the first merge address. Furthermore, operation S400 may include operation S420 in which the second hit signal is generated when the logic level of the merged decoded row address among the merged decoded row addresses matches the logic level of the second merge address.

For example, referring to FIG. 3, when the logic levels of the merged decoded row addresses MDRA<0> and MDRA<1> match the logic level of the first merge address AB_FA1, the comparison circuit 440 may generate the first hit signal AB_HIT1. When the logic levels of the merged decoded row addresses MDRA<0> and MDRA<1> match the logic level of the second merge address AB_FA2, the comparison circuit 440 may generate the second hit signal AB_HIT2.

For example, referring to FIG. 5, when the logic levels of the merged decoded row addresses MDRA<0> and MDRA<1> match the logic level of the first merge address AB_FA1, the first comparison circuit 570 may generate the first hit signal AB_HIT1. When the logic levels of the merged decoded row addresses MDRA<0> and MDRA<1> match the logic level of the second merge address AB_FA2, the second comparison circuit 580 may generate the second hit signal AB_HIT2.

Referring again to FIG. 7, the logic operator may receive the first hit signal and the second hit signal and output a valid hit pre-signal at operation S500.

For example, referring to FIG. 3, the logic operator 450 may receive the first hit signal AB_HIT1 and the second hit signal AB_HIT2 and output the valid hit pre-signal VALID_HIT_PRE.

For example, referring to FIG. 5, the logic operator 590 may receive the first hit signal AB_HIT1 and the second hit signal AB_HIT2 and output the valid hit pre-signal VALID_HIT_PRE.

Referring again to FIG. 7, a valid hit latch may receive a valid hit pre-signal and output a valid hit signal at operation S600.

Figure 11:
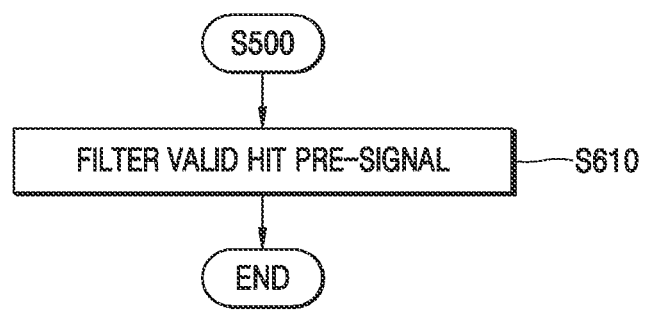

In an embodiment, referring to FIGS. 7 and 11, operation S600 may further include operation S610 in which the valid hit-pre signal is filtered.

For example, referring to FIGS. 3 and 5 together, the valid hit latches 460 and 595 may further receive the valid hit filter signal BRA_OR_AP and output the valid hit signal VALID_HIT. The valid hit latches 460 and 595 may output the valid hit signal VALID_HIT by filtering the valid hit pre-signal VALID_HIT_PRE.

Figure 12:
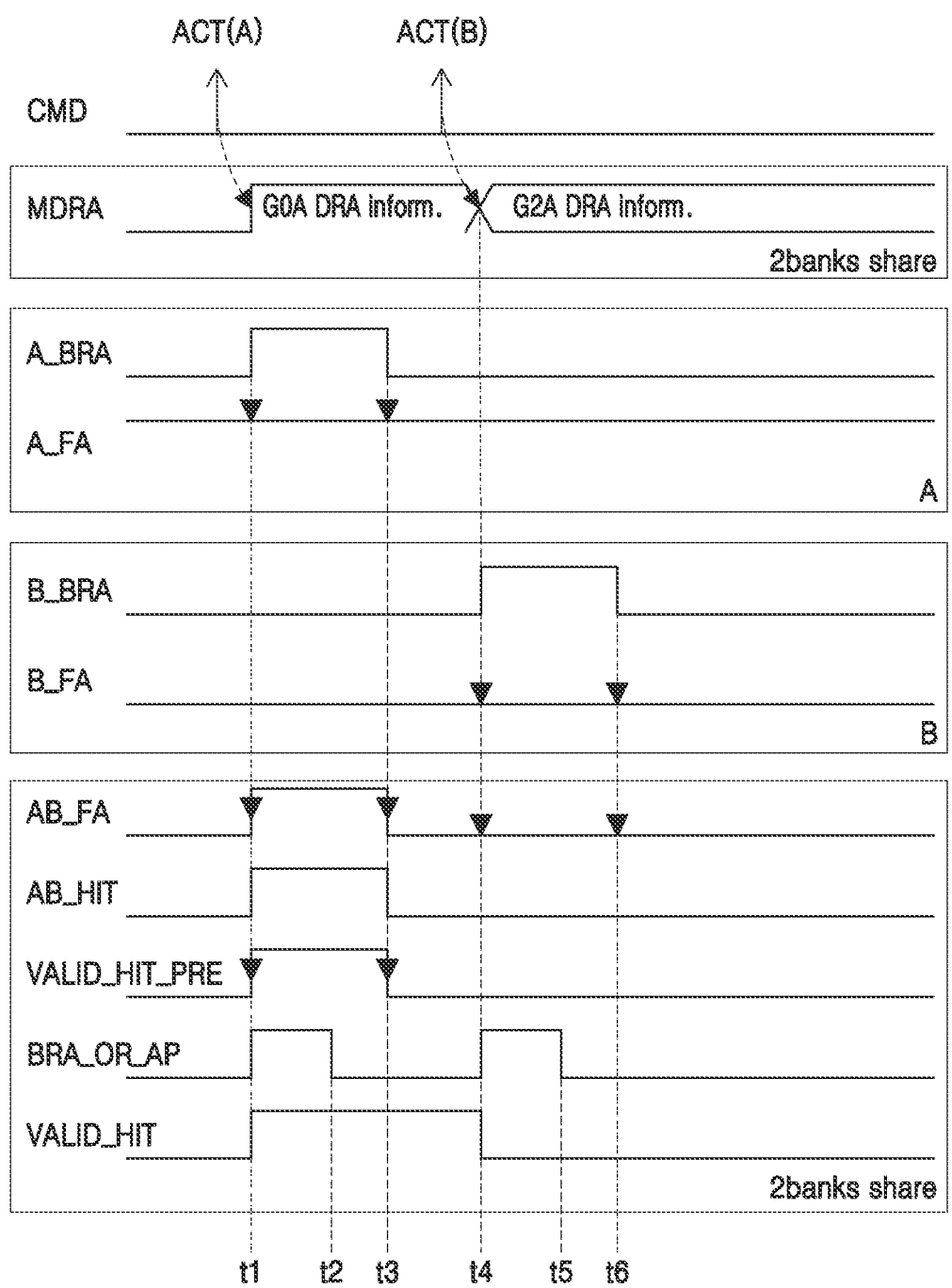
FIG. 12 is a diagram illustrating timing of an operation of a repair circuit according to embodiments.

FIG. 12 is a diagram illustrating timing of an operation of a repair circuit according to embodiments.

Referring to FIG. 12, a merged decoded row address MDRA may be activated according to a first activation command ACT(A) for a first bank A. The merged decoded row address MDRA may be deactivated according to a second activation command ACT(B) for a second bank B.

In an embodiment, at a first time point t1, the first activation command ACT(A) may be generated and the merged decoded row address MDRA may be activated. In this case, a merged row address may include a merged decoded row address signal for the first bank, active information of the first bank, and the like. Simultaneously with or after the merged decoded row address MDRA being activated, the logic levels of the row address active signal A_BRA corresponding to the first bank, the merge address AB_FA, the valid hit pre-signal VALID_HIT_PRE, and the valid hit filter signal BRA_OR_AP may transition from low to high.

At a second time point t2, the logic level of the valid hit filter signal BRA_OR_AP may transition from high to low.

At a third time point t3, logic levels of the row address active signal A_BRA, the hit signal AB_HIT, and the valid hit pre-signal VALID_HIT_PRE of the first bank may transition from high to low.

At a fourth time point t4, the second activation command ACT(B) may be generated and the merged decoded row address MDRA may be deactivated. In this case, the merged row address MDRA may include a merged decoded row address signal for the second bank, active information of the second bank, and the like. Simultaneously with or after the merged decoded row address MDRA being deactivated, the logic level of the row address active signal B_BRA and the valid hit filter signal BRA_OR_AP of the second bank may transition from low to high.

At a fifth time point t5, the logic level of the valid hit filter signal BRA_OR_AP may transition from high to low.

At a sixth time point t6, the logic level of the row address active signal B_BRA corresponding to the second bank may transition from high to low.

Accordingly, an activation command for one bank may be deactivated when an activation command for the other bank is generated. For example, the first bank A may perform precharge while the second bank B is activated.

Figure 13:
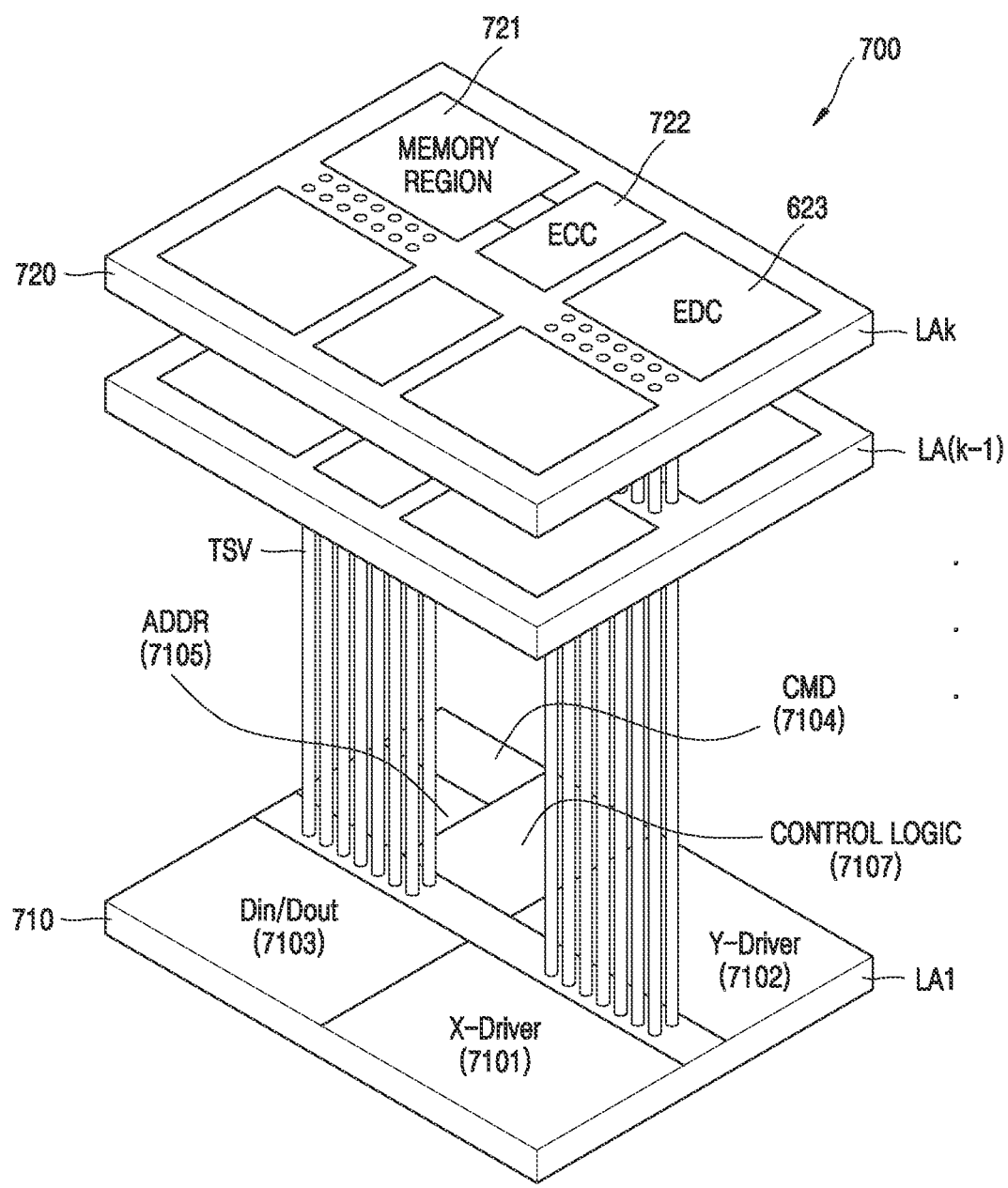
FIG. 13 is a diagram illustrating a semiconductor memory device according to embodiments.

FIG. 13 is a diagram illustrating a semiconductor memory device 700 according to embodiments.

As shown in FIG. 13, the semiconductor memory device 700 may include a plurality of semiconductor layers LA1 to LAk, (where k is a natural number greater than or equal to 3. In embodiments, the lowermost semiconductor layer LA1 may be a master chip, and the other semiconductor layers LA2 to LAk may be slave chips. The semiconductor layers LA1 to LAk may transmit and receive signals to and from each other through through-silicon vias TSV, and the master chip LA1 may communicate with an external memory controller through a conductive unit formed on an outer surface thereof. An example of a structure and operation of the semiconductor memory device 700 is described below based on the first semiconductor layer 710 as a master chip and the second semiconductor layer 720 as a slave chip.

The first semiconductor layer 710 may include various peripheral circuits for driving a memory region 721 provided in slave chips. For example, the first semiconductor layer 710 may include a row driver 7101 (illustrated as "X-Driver") for driving a word line of a memory, a column driver 7102 (illustrated as "Y-Driver") for driving a bit line of a memory, a data I/O unit 7103 (illustrated as "Din/Dout") for controlling input and output of data, a command buffer (CMD) 7104 for receiving and buffering commands from the outside, and an address buffer 7105 for receiving and buffering addresses from the outside. As described above with reference to FIG. 4, the memory region 721 may include a normal cell array in which main data and parity data are stored and a redundancy cell array for repairing defects of the normal cell array.

Also, the first semiconductor layer 710 may further include a control logic 7107. The control logic 7107 may control access to the memory region 721 based on command and address signals provided from a memory controller and generate control signals for accessing the memory region 721.

In embodiments, the second semiconductor layer 720 may include an error correction circuit 722 (illustrated as "ECC") for correcting errors occurring in memory cells included in the memory region 721 and an error determination circuit 723 (illustrated as "EDC") for determining an error occurring in the memory cells included in the memory region 721 in a test mode.

Figure 14:
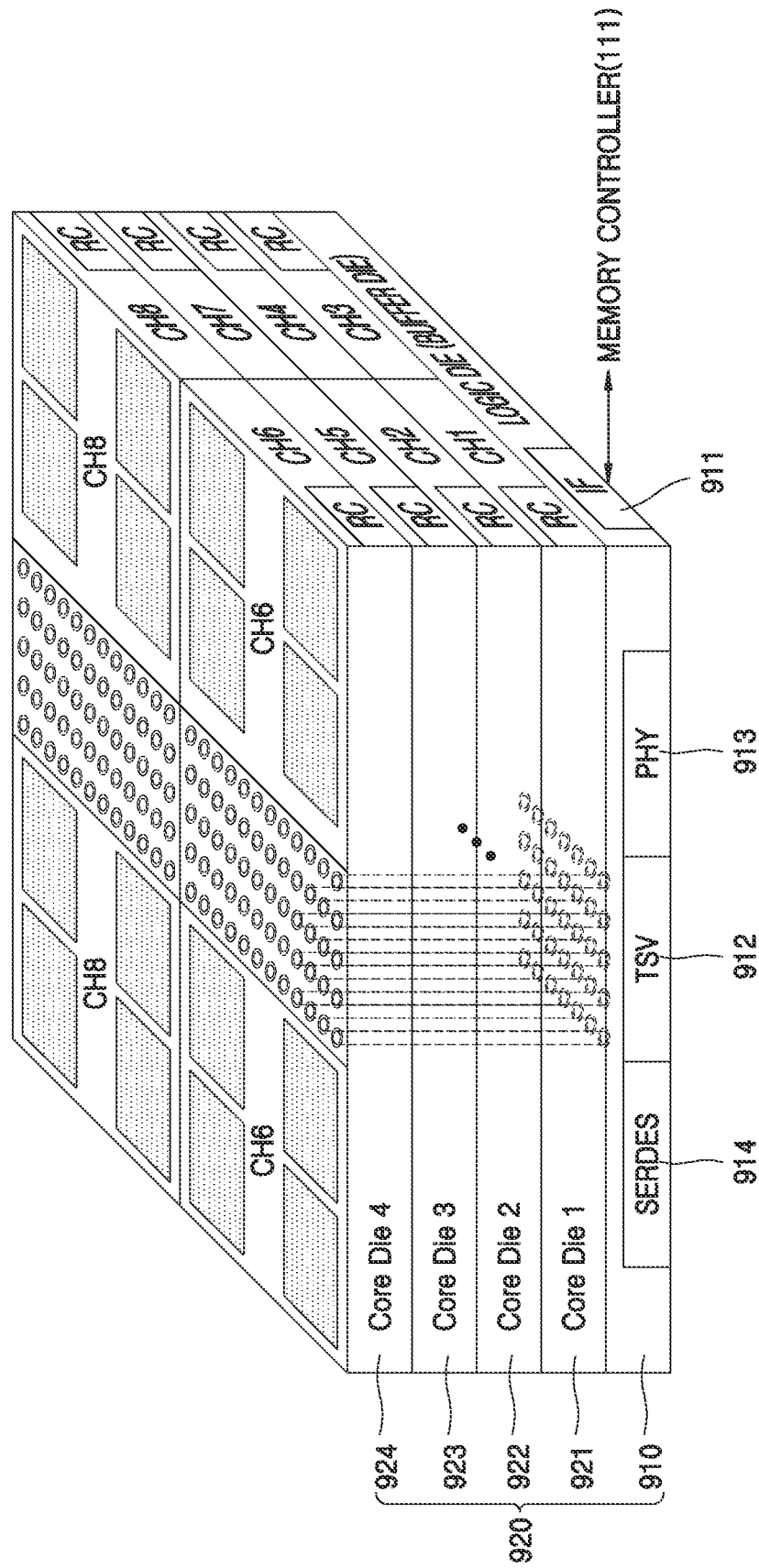
FIG. 14 is a diagram illustrating a memory device implemented as a high bandwidth memory (HBM) according to embodiments.

FIG. 14 is a diagram illustrating a memory device 140 implemented as HBM according to embodiments.

Referring to FIG. 14, the HBM configuration shown in FIG. 14 may be provided as an example, and is not limited to that shown in FIG. 14. The memory device 140 illustrated in FIG. 14 may be referred to as HBM.

Referring to FIG. 14, the memory device 1100 may be connected to a host (e.g., the host device 110 shown in FIG. 1) through the HBM protocol of the JEDEC standard. The HBM protocol may be a high-performance random access memory interface for three-dimensional stacked memories (e.g., DRAM). The memory device 1100 may achieve a greater bandwidth, while consuming less power, generally in a substantially smaller form factor than other DRAM technologies (e.g., DDR4, GDDR5, etc.).

The memory device 1100 may have a high bandwidth by including a plurality of channels CH1 to CH8 having interfaces independent of each other. The memory device 1100 may include a plurality of dies 920. For example, the memory device 1100 may include a logic die (or buffer die) 910 and one or more core dies 920. The one or more core dies 920 may be stacked over the logic die 910. In FIG. 14, first to fourth core dies 921 to 924 may be included in the memory device 1100, but the number of one or more core dies 920 may be variously changed. The one or more core dies 920 may be referred to as memory dies.

Each of the first to fourth core dies 921 to 924 may include one or more channels. For example, each of the first to fourth core dies 921 to 924 may include two channels, and the memory device 1100 may include eight channels CH1 to CH8. For example, the first core die 921 may include a first channel CH1 and a third channel CH3, the second core die 922 may include a second channel CH2 and a fourth channel CH4, the third core die 923 may include a fifth channel CH5 and a seventh channel CH7, and the fourth core die 924 may include a sixth channel CH6 and an eighth channel CH8.

The logic die 910 may include an interface circuit 911 that may communicate with a memory controller 111. The logic die 910 may receive commands/addresses and data from the memory controller 111 through the interface circuit 911.

The interface circuit 911 may be a channel through which the memory controller 111 requests a memory operation or calculation process, and may transfer a command/address and data. Each of the core dies 920 or each of the channels CH1 to CH8 may include a processor-in-memory (PIM) circuit.

Each of the channels CH1 to CH8 may include a plurality of banks, and one or more processing elements may be provided in the PIM circuit of each channel. As an example, the number of processing elements in each channel may be equal to the number of banks. Because the number of processing elements may be less than the number of banks, one processing element may be shared by at least two banks. The PIM circuit of each channel may execute a kernel offloaded by the memory controller 111.

Each of the channels CH1 to CH8 may include a repair circuit RC, which may correspond to at least one of the repair circuit 302, the repair circuit 400, the repair circuit 500, and the repair circuit 600 described above with reference to FIGS. 1 to 13. Each of the channels CH1 to CH8 may further include a memory cell array and a control circuit.

The logic die 910 may include a through-silicon via (TSV) region 912, an HBM physical layer interface (PHY) region 913, and a serializer/deserializer (SERDES) region 914. The TSV region 912 may be a region in which TSVs for communication with the core dies 920 are formed, and may be a region in which one or more buses disposed to correspond to channels CH1 to CH8 are formed. When each of the channels CH1 to CH8 has a bandwidth of 128 bits, the TSVs may include components for inputting/outputting data of 1024 bits.

The HBM PHY region 913 may include a plurality of I/O circuits for communication between the memory controller 111 and the channels CH1 to CH8, and as an example, the HBM PHY region 913 may include one or more interconnect circuits for connecting the memory controller 111 to the channels CH1 to CH8. The HBM PHY region 913 may include physical or electrical layers and logical layers provided for signals, frequency, timing, driving, detailed operating parameters and functionality required for efficient communication between the memory controller 111 and the channels CH1 to CH8. The HBM PHY region 913 may perform memory interfacing, such as selecting a row and column corresponding to a memory cell for a corresponding channel, writing data to a memory cell, or reading written data. The HBM PHY region 913 may support features of the HBM protocol of the JEDEC standard.

The SERDES region 914 may provide a SERDES interface of the JEDEC standard as processing throughput of one or more processors of the memory controller 111 increases and as demand for a memory bandwidth increases. The SERDES region 914 may include a SERDES transmitter portion, a SERDES receiver portion, and a controller portion. The SERDES transmitter portion may include a parallel-to-serial circuit and transmitter, receive parallel data streams, and serialize the received parallel data streams. The SERDES receiver portion may include receiver amplifiers, equalizers, clock and data recovery circuits, and serial-to-parallel circuits, receive serial data streams, and parallelize the received serial data streams. The controller portion may include an error detection circuit, an error correction circuit, and registers, such as first-in first-out (FIFO).

The memory controller 111 may transmit commands/addresses and data through the one or more buses arranged to correspond to the channels CH1 to CH8. In some embodiments, the one or more buses may be formed to be distinguished for channels, or some of the buses may be shared by at least two channels.

The memory controller 111 may provide commands/addresses and data so that at least some of a plurality of computational tasks or kernels may be executed in the memory device 1100. Arithmetic processing may be performed in the PIM circuit of the channel designated by the memory controller 111. For example, when the received command/address instructs arithmetic processing, the PIM circuit of the corresponding channel performs arithmetic processing using write data provided from the memory controller 111 and/or read data provided from the corresponding channel. As another example, when a command/address received through a corresponding channel of the memory device 1100 instructs a memory operation, a data access operation may be performed.

Figure 15:
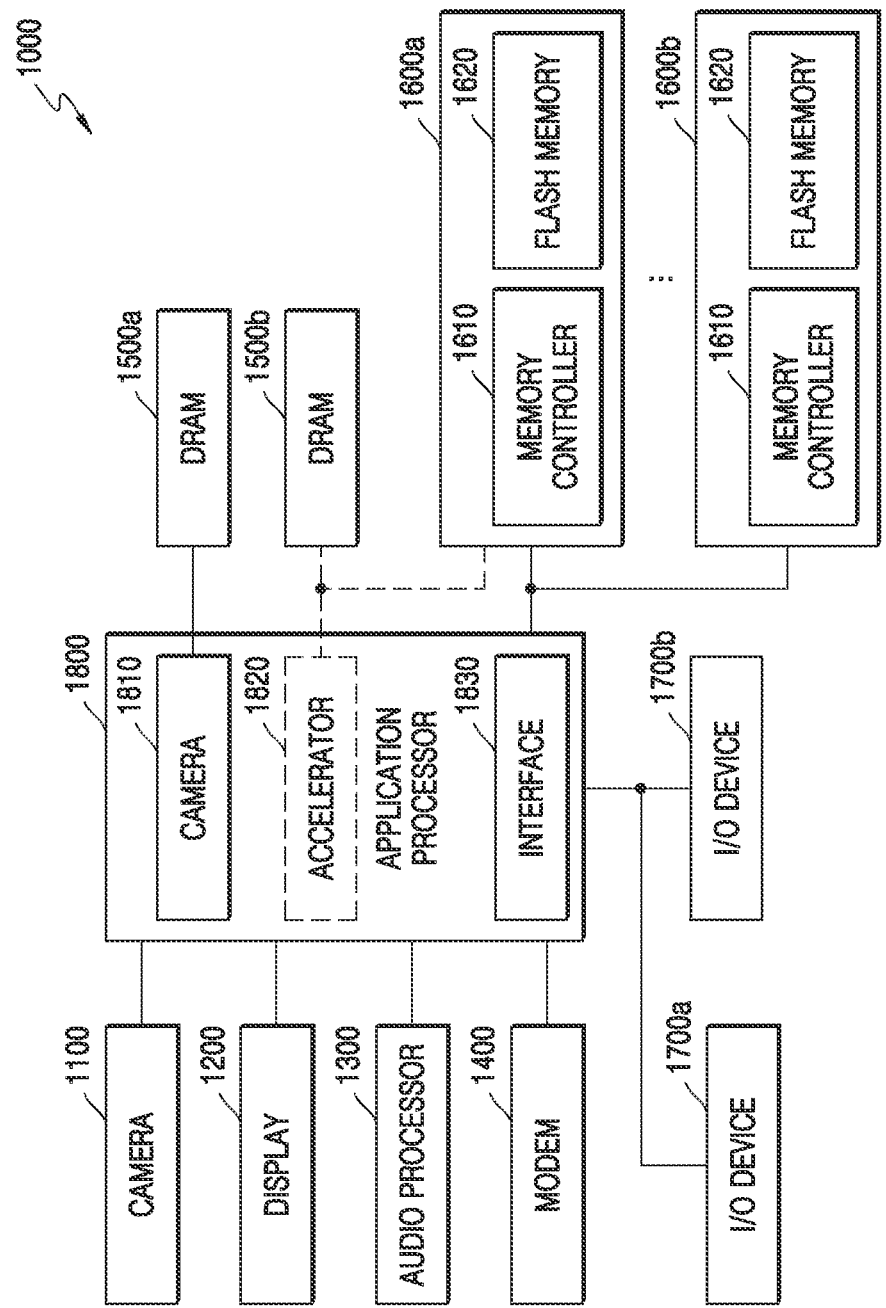
FIG. 15 is a diagram illustrating a system according to embodiments.

FIG. 15 is a diagram illustrating a system 1000 according to embodiments.

Referring to FIG. 15, the system 1000 may include a camera 1100, a display 1200, an audio processor 1300, a modem 1400, DRAMs 1500*a* and 1500*b*, flash memories 1600*a* and 1600*b*, I/O devices 1700*a* and 1700*b*, and an application processor (AP) 1800. The system 1000 may be implemented as or including a mobile phone, a smartphone, a personal computer (PC), a tablet PC, a laptop PC, a wearable device, a healthcare device, or an Internet of things (IoT) device. Also, the system 1000 may be implemented as a server or a personal computer.

The camera 1100 may capture a still image or a video under user control, and may store or transmit the captured image/video data to the display 1200.

The audio processor 1300 may process audio data included in the flash memory devices 1600*a* and 1600*b* or network content.

The modem 1400 may modulate and transmit a signal to transmit/receive wired/wireless data, and a receiver may demodulate the signal to restore an original signal.

The I/O devices 1700*a* and 1700*b* may include devices that provide a digital input and/or output function, such as universal serial bus (USB) or storage, digital cameras, secure digital (SD) cards, digital versatile disc (DVD), network adapters, touch screens, and the like.

The AP 1800 may control the overall operation of the system 1000. The AP 1800 may control the display 1200 to display a portion of content stored in the flash memory devices 1600*a* and 1600*b*. When a user input is received through the I/O devices 1700*a* and 1700*b*, the AP 1800 may perform a control operation corresponding to the user input. The AP 1800 may include an accelerator block, which is a dedicated circuit for artificial intelligence (AI) data calculation, or may include an accelerator chip 1820 separate from the AP 1800. A DRAM 1500*b* may be additionally mounted on the accelerator block or the accelerator chip 1820. The accelerator chip 1820 may be a functional block specialized in performing certain functions of the AP 1800, and an accelerator may include a GPU which is a functional block specialized in performing graphics data processing, a neural processing unit (NPU), which is a block specialized in performing AI calculation and inference, and a data processing unit (DPU) which is a block specialized in data transmission.

The system 1000 may include a plurality of DRAMs 1500*a* and 1500*b*. The AP 1800 may control the DRAMs 1500*a* and 1500*b* through commands and mode register (MRS) settings conforming to the JEDEC standard, or perform communication by setting a DRAM interface protocol to use company-specific functions, such as low voltage/high speed/reliability and cyclic redundancy check (CRC)/ECC function. For example, the AP 1800 may communicate with the DRAM 1500*a* through an interface conforming to JEDEC standards, such as LPDDR4 and LPDDR5, and the accelerator block or accelerator chip 1820 may perform communication by setting a new DRAM interface protocol to control the DRAM 1500*b* having a bandwidth higher than the DRAM 1500*a*.

Although only the DRAMs 1500*a* and 1500*b* are shown in FIG. 15, embodiments are not limited thereto, and any of phase change random-access memory (PRAM), static RAM (SRAM), magnetoresistive random access memory (MRAM), resistive random access memory (RRAM), ferroelectric random access memory (FeRAM), or hybrid RAM may be used as long as the memory satisfies the bandwidth, response speed, and voltage conditions of the AP 1800 or the accelerator chip 1820. The DRAMs 1500*a* and 1500*b* may have relatively smaller latency and bandwidth than the I/O devices 1700*a* and 1700*b* or the flash memories 1600*a* and 1600*b*. The DRAMs 1500*a* and 1500*b* may be initialized when the system 1000 is powered on, and an operating system and application data may be loaded to the DRAMs 1500*a* and 1500*b* so that the DRAMs 1500*a* and 1500*b* may be used as temporary storage locations or as execution spaces for various software codes.

In the DRAMs 1500*a* and 1500*b*, operations such as addition, subtraction, multiplication, division, vector operations, address operations, or fast Fourier transform (FFT) operations may be performed. In addition, a function for execution used for inference may be performed within the DRAMs 1500*a* and 1500*b*. Here, inference may be performed in a deep learning algorithm using an artificial neural network. The deep learning algorithm may include a training operation of training a model through various data and an inference operation of recognizing data with the trained model. In an embodiment, an image captured by the user through the camera 100) may be signal-processed and stored in the DRAM 1500*b*, and the accelerator block or accelerator chip 1820 may perform AI data operation of recognizing data using data stored in the DRAM 1500*b* and a function used in inference.

The system 1000 may include a plurality of storages or a plurality of flash memories 1600*a* and 1600*b* having a larger capacity than the DRAMs 1500*a* and 1500*b*. The accelerator block or accelerator chip 1820 may perform a training operation and AI data calculation using the flash memory devices 1600*a* and 1600*b*. In an embodiment, the flash memories 1600*a* and 1600*b* may efficiently perform a training operation and inference AI data calculation performed by the AP 1800 and/or the accelerator chip 1820 using an arithmetic unit included in the memory controller 1610. The flash memories 1600*a* and 1600*b* may store imaged captured through the camera 1100 or data transmitted through a data network. For example, augmented reality/virtual reality, high definition (HD), or ultra-high definition (UHD) content may be stored.

The DRAMs 1500*a* and 1500*b* may include the repair circuit described above with reference to FIGS. 1 to 14.

At least one of the components, elements, modules, units, or the like (collectively "components" in this paragraph) represented by a block or an equivalent indication (collectively "block") in the above embodiments, for example, device, logic, controller, circuit, generator, detector, encoder, decoder, operator, latch, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). These components may, for example, be embodied in one or more semiconductor chips, or on substrate supports such as printed circuit boards and the like. These circuits may also be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

While some embodiments have been particularly shown and described, it will be understood that various changes in form and details may be made therein without departing from the spirit and scope of the following claims.

What is claimed is:

1. A repair circuit comprising:
    a first fail address latch configured to latch a first fail address and a second fail address corresponding to a first bank;
    a second fail address latch configured to latch a third fail address and a fourth fail address corresponding to a second bank which is different from the first bank;
    a fail address multiplexer configured to output a first merge address by merging the first fail address with the third fail address, and to output a second merge address by merging the second fail address with the fourth fail address;
    a comparison circuit configured to compare a logic level of the first merge address with logic levels of merged decoded row addresses to generate a first hit signal, and to compare a logic level of the second merge address with the logic levels of the merged decoded row addresses to generate a second hit signal;
    a logic operator configured to receive the first hit signal and the second hit signal, and to output a valid hit pre-signal; and
    a valid hit latch configured to receive the valid hit pre-signal and to output a valid hit signal based on the valid hit pre-signal.

2. The repair circuit of claim 1, wherein each of the first fail address latch and the second fail address latch comprises an anti-fuse array comprising a plurality of anti-fuse cells,
    wherein the first fail address latch is further configured:
        to receive a first fail address pre-signal and output the first fail address corresponding to a first anti-fuse cell from among the plurality of anti-fuse cells,
        to receive a second fail address pre-signal and output the second fail address corresponding to the first anti-fuse cell, and
    wherein the second fail address latch is further configured:
        to receives a third fail address pre-signal and output the third fail address corresponding to a second anti-fuse cell among the plurality of anti-fuse cells, and
        to receive a fourth fail address pre-signal and output the fourth fail address corresponding to the second anti-fuse cell.

3. The repair circuit of claim 1, wherein the fail address multiplexer is further configured to receive a row address active signal corresponding to the first bank and a row address active signal corresponding to the second bank to activate the first merge address or the second merge address.

4. The repair circuit of claim 1, wherein the comparison circuit is further configured:
    to generate the first hit signal based on a logic level of a merged decoded row address from among the merged decoded row addresses matching the logic level of the first merge address, and
    to generate the second hit signal based on the logic level of the merged decoded row address matching the logic level of the second merge address.

5. The repair circuit of claim 1, wherein the valid hit latch is further configured to receive a valid hit filter signal and filter the valid hit pre-signal based on the valid hit filter signal.

6. The repair circuit of claim 1, wherein the first fail address and the third fail address share a row address.

7. The repair circuit of claim 6, wherein the row address is a first row address, and
    wherein the second fail address and the fourth fail address share a second row address different from the first row address.

8. The repair circuit of claim 1, wherein the logic operator comprises an AND gate configured to perform an AND operation based on a logic level of the first hit signal and a logic level of the second hit signal.

9. A memory device comprising:
    a merged bank comprising memory cells coupled to a plurality of word lines;
    a row decoder configured to transmit a row select signal through the plurality of word lines and to select at least one word line of the merged bank; and
    a repair circuit configured to repair a fail address corresponding to the selected word line,
    wherein the merged bank comprises a first bank and a second bank, and
    wherein the repair circuit comprises:
        a first fail address latch configured to latch a first fail address and a second fail address corresponding to the first bank;
        a second fail address latch configured to latch a third fail address and a fourth fail address corresponding to the second bank;
        a fail address multiplexer configured to output a first merge address by merging the first fail address with the third fail address, and to output a second merge address by merging the second fail address with the fourth fail address;
        a comparison circuit configured to compare a logic level of the first merge address with logic levels of merged decoded row addresses to generate a first hit signal, and to compare a logic level of the second merge address with logic levels of the merged decoded row addresses to generate a second hit signal;
        a logic operator configured to receive the first hit signal and the second hit signal, and to output a valid hit pre-signal; and
        a valid hit latch configured to receive the valid hit pre-signal and to output a valid hit signal.

10. The memory device of claim 9, wherein each of the first fail address latch and the second fail address latch comprises an anti-fuse array comprising a plurality of anti-fuse cells, wherein the first fail address latch is further configured to receive at least one of a first fail address pre-signal and a second fail address pre-signal and to output at least one of the first fail address and the second fail address, and wherein the second fail address latch is further configured to receive at least one of a third fail address pre-signal and a fourth fail address pre-signal and to output at least one of the third fail address and the fourth fail address.

11. The memory device of claim 9, wherein the fail address multiplexer is further configured to receive a row address active signal corresponding to the first bank and a row address active signal corresponding to the second bank to activate the first merge address or the second merge address.

12. The memory device of claim 9, wherein the comparison circuit is further configured:

to generate the first hit signal based on a logic level of a merged decoded row address from among the merged decoded row addresses matching the logic level of the first merge address, and to generate the second hit signal based on the logic level of the merged decoded row address matching the logic level of the second merge address.

13. The memory device of claim 9, wherein the valid hit latch is further configured to receive a valid hit filter signal and filter the valid hit pre-signal based on the valid hit filter signal.

14. The memory device of claim 9, wherein the first fail address and the third fail address share a row address.

15. The memory device of claim 14, wherein the row address is a first row address, and wherein the second fail address and the fourth fail address share a second row address different from the first row address.

16. The memory device of claim 9, wherein the logic operator comprises an AND gate configured to perform an AND operation based on a logic level of the first hit signal and a logic level of the second hit signal.

17. An operating method of a memory device including a repair circuit for repairing addresses of two or more merged banks, the operating method comprising:

receiving a first fail address pre-signal of a first bank and obtaining a first fail address;

receiving a second fail address pre-signal of a second bank and obtaining a second fail address;

receiving a third fail address pre-signal of a third bank and obtaining a third fail address;

receiving a third fail address pre-signal of a fourth bank and obtaining a fourth fail address;

generating a first merge address based on the first fail address and the second fail address;

generating a second merge address based on the third fail address and the fourth fail address;

generating a first hit signal by comparing a logic level of a first merged decoded row address with a logic level of the first merge address;

generating a second hit signal by comparing a logic level of a second merged decoded row address with a logic level of the second merge address;

generating a valid hit pre-signal based on the first hit signal and the second hit signal; and outputting a valid hit signal based on the valid hit pre-signal.

18. The operating method of claim 17, wherein at least one of the generating of the first merge address and the generating of the second merge address comprises:

receiving, by the first bank and the second bank, an active signal corresponding to the first merged decoded row address and activating the first merge address; and receiving, by the third bank and the fourth bank, an active signal corresponding to the second merged decoded row address and activating the second merge address.

19. The operating method of claim 17, wherein the first hit signal is generated based on a logic level of the first merged decoded row address matching the logic level of the first merge address; and wherein the second hit signal is generated based on a logic level of the second merged decoded row address matching the logic level of the second merge address.

20. The operating method of claim 17, wherein the outputting of the valid hit signal comprises filtering the valid hit pre-signal.

* * * * *